US 12,037,954 B2

United States Patent
Sukegawa et al.

(10) Patent No.: US 12,037,954 B2
(45) Date of Patent: Jul. 16, 2024

(54) INTERNAL COMBUSTION ENGINE CONTROL DEVICE

(71) Applicant: Hitachi Astemo, Ltd., Hitachinaka (JP)

(72) Inventors: Yoshihiro Sukegawa, Tokyo (JP); Shinya Sato, Ibaraki (JP); Masayuki Saruwatari, Ibaraki (JP); Atsushi Shimada, Tokyo (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 127 days.

(21) Appl. No.: 17/792,515

(22) PCT Filed: Jan. 22, 2021

(86) PCT No.: PCT/JP2021/002155
§ 371 (c)(1),
(2) Date: Jul. 13, 2022

(87) PCT Pub. No.: WO2021/199610
PCT Pub. Date: Oct. 7, 2021

(65) Prior Publication Data
US 2023/0054131 A1 Feb. 23, 2023

(30) Foreign Application Priority Data
Mar. 31, 2020 (JP) .................. 2020-062673

(51) Int. Cl.
*F02D 41/00* (2006.01)
(52) U.S. Cl.
CPC ....... *F02D 41/0097* (2013.01); *F02D 41/009* (2013.01); *F02D 2200/101* (2013.01)
(58) Field of Classification Search
CPC ............. F02D 41/0097; F02D 41/009; F02D 2200/101; F02D 35/028; F02D 41/1498; Y02T 10/40
See application file for complete search history.

(56) References Cited

U.S. PATENT DOCUMENTS

| 2003/0164155 A1* | 9/2003 | Arakawa ............... F02D 41/221 123/406.47 |
| 2019/0390625 A1* | 12/2019 | Nitta ..................... F02D 41/182 |

(Continued)

FOREIGN PATENT DOCUMENTS

| EP | 3061953 A1 * | 8/2016 | ............... F02B 5/02 |
| JP | 2007-170203 A | 7/2007 | |

(Continued)

OTHER PUBLICATIONS

Chinese-language Office Action issued in Chinese Application No. 202180008587.9 dated Jul. 4, 2023 with English translation (14 pages).

(Continued)

*Primary Examiner* — Joseph J Dallo
(74) *Attorney, Agent, or Firm* — Crowell & Moring LLP

(57) ABSTRACT

To accurately estimate a combustion state even in a case where the combustion state in a combustion chamber greatly changes. According to an aspect of the present invention, an internal combustion engine control device 12 includes a rotational speed calculation unit 122*a* that calculates a crank rotational speed of an internal combustion engine, an extreme value timing calculation unit 122*b* that calculates an extreme value timing at which the crank rotational speed calculated by the rotational speed calculation unit 122*a* becomes an extreme value, a combustion-state-calculation-means selection unit 122*c* that selects combustion state calculation means for calculating a combustion state in a combustion chamber based on an operation state of the internal combustion engine, and a combustion state estimation unit 122*d* that estimates the combustion state in the combustion chamber from the extreme value timing of the crank rotational speed by using the combustion state calcu- (Continued)

lation means selected by the combustion-state-calculation-means selection unit 122c.

16 Claims, 19 Drawing Sheets

(56) References Cited

U.S. PATENT DOCUMENTS

| | | | | |
|---|---|---|---|---|
| 2020/0362960 | A1* | 11/2020 | Harada | F16H 59/18 |
| 2020/0362961 | A1* | 11/2020 | Harada | F16H 61/0021 |
| 2021/0349528 | A1* | 11/2021 | Son | G06F 3/013 |

FOREIGN PATENT DOCUMENTS

| | | | | |
|---|---|---|---|---|
| JP | 2012062844 | A * | 3/2012 | |
| JP | 2014001640 | A * | 1/2014 | |
| JP | 2017-150393 | A | 8/2017 | |
| WO | WO-2010134209 | A1 * | 11/2010 | F01N 13/009 |
| WO | WO-2010140263 | A1 * | 12/2010 | F01N 11/00 |
| WO | WO-2011108120 | A1 * | 9/2011 | F02B 75/044 |
| WO | WO-2011136151 | A1 * | 11/2011 | F02D 19/0644 |
| WO | WO-2020235218 | A1 * | 11/2020 | F02D 35/028 |

OTHER PUBLICATIONS

English translation (JP 2007-170203 A, filed on Jul. 13, 2022) (21 pages).

International Search Report (PCT/ISA/210) issued in PCT Application No. PCT/JP2021/002155 dated May 11, 2021 with English translation (four (4) pages).

Japanese-language Written Opinion (PCT/ISA/237) issued in PCT Application No. PCT/JP2021/002155 dated May 11, 2021 (three (3) pages).

* cited by examiner

INTERNAL COMBUSTION ENGINE CONTROL DEVICE

TECHNICAL FIELD

The present invention relates to an internal combustion engine control device, and particularly relates to a technique of estimating a combustion timing in a combustion chamber.

BACKGROUND ART

In recent years, regulations on fuel consumption (fuel consumption) and exhaust gas harmful components in engines have been strengthened, and such regulations tend to be further strengthened in the future. Under such circumstances, there is known a technique of estimating a combustion state in a combustion chamber of an engine and controlling the engine based on the estimation result. By appropriately controlling the ignition timing, the injection timing, and the like in accordance with the current combustion state, it is possible to increase the thermal efficiency of the engine and reduce the emission of the harmful gas. An example of such a combustion state estimation technique is disclosed in, for example, PTL 1.

PTL 1 discloses that "an acceleration calculation unit that calculates a rotational acceleration with respect to a rotational position of an output shaft, and an estimation unit that estimates a combustion state in a combustion chamber of an internal combustion engine based on the rotational acceleration calculated by the acceleration calculation unit". Further, PTL 1 discloses that "the acceleration calculation unit calculates the rotational position at which the rotational acceleration of the output shaft becomes an extreme value, and the estimation unit estimates the combustion state based on the rotational position at which the rotational acceleration of the output shaft becomes the extreme value".

CITATION LIST

Patent Literature

PTL 1: JP 2017-150393 A

SUMMARY OF INVENTION

Technical Problem

In a moving object such as an automobile, the internal combustion engine is often operated in a transient state such as acceleration or deceleration, and there is a probability that the combustion state (for example, a combustion phase) changes in a wide range. According to the examination of the present inventors, it has been found that a correlation characteristic between a combustion phase and the rotational position at which the rotational speed or the rotational acceleration becomes the extreme value changes in a case where the combustion phase is greatly advanced as compared with a case where the combustion phase is not greatly advanced. In PTL 1 disclosed above, in a case where the combustion phase greatly changes without considering this change in correlation characteristic, the estimation accuracy of the combustion phase may be significantly reduced.

The present invention has been made in view of the above circumstances, and an object of the present invention is to accurately estimate a combustion state even in a case where the combustion state in a combustion chamber greatly changes.

Solution to Problem

To solve the above problems, according to an aspect of the present invention, an internal combustion engine control device includes a rotational speed calculation unit that calculates a crank rotational speed of an internal combustion engine, an extreme value timing calculation unit that calculates an extreme value timing at which the crank rotational speed calculated by the rotational speed calculation unit becomes an extreme value, a combustion-state-calculation-means selection unit that selects combustion state calculation means for calculating a combustion state in a combustion chamber based on an operation state of the internal combustion engine, and a combustion state estimation unit that estimates the combustion state in the combustion chamber from the extreme value timing of the crank rotational speed by using the combustion state calculation means selected by the combustion-state-calculation-means selection unit.

Advantageous Effects of Invention

According to at least one aspect of the present invention, it is possible to accurately estimate a combustion state even in a case where the combustion state in a combustion chamber greatly changes.

Objects, configurations, and advantageous effects other than those described above will be clarified by the descriptions of the following embodiments.

DESCRIPTION OF EMBODIMENTS

Hereinafter, embodiments for embodying the present invention will be described with reference to the accompanying drawings. In the present specification and the attached drawings, components having substantially the same functions or configurations are designated by the same reference signs, and repetitive description will be omitted.

<First Embodiment>[Configuration of Engine] First, an example of an engine to which the present invention is applied will be described with reference to FIG. 1.

Figure 1:
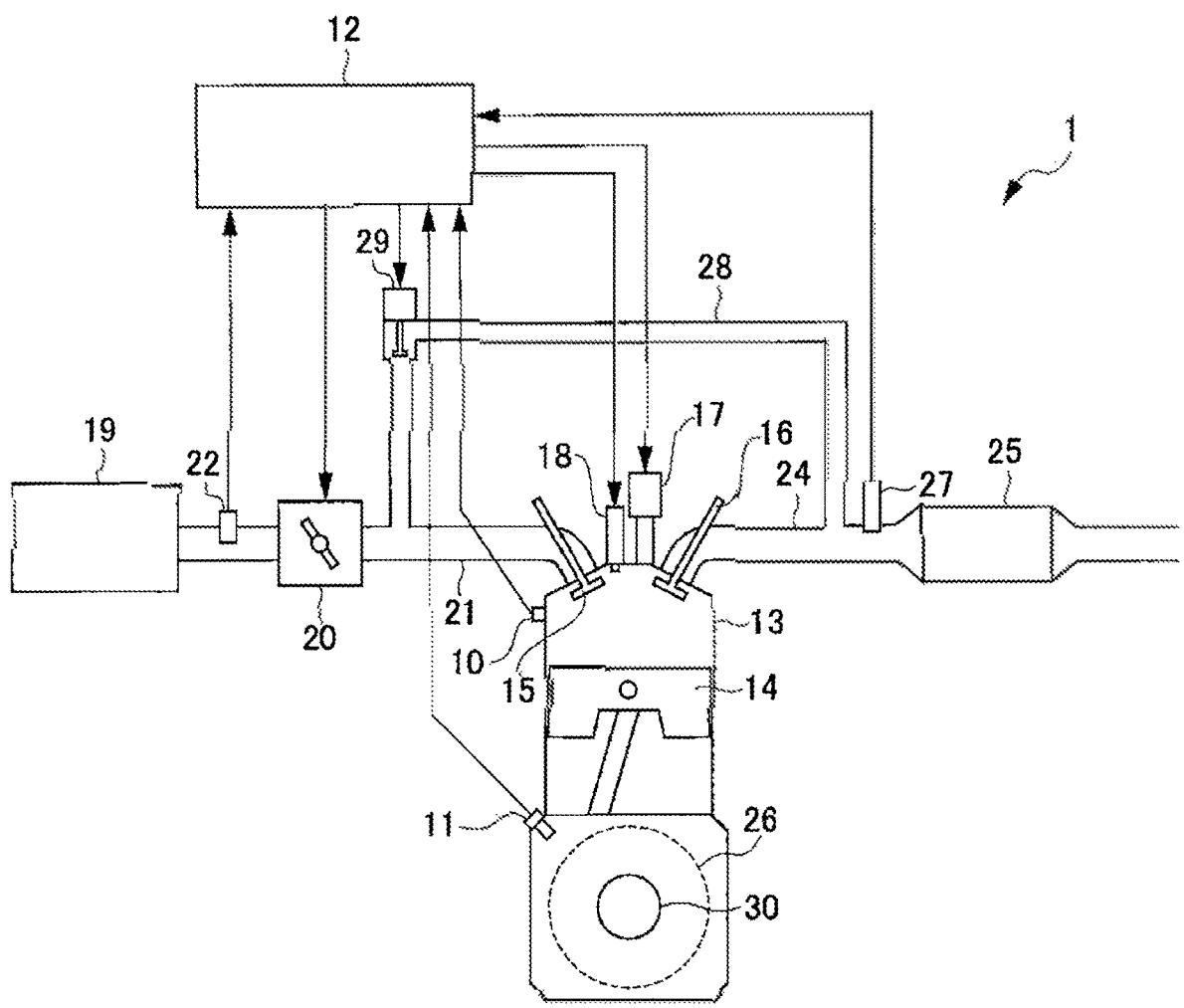
FIG. 1 is an explanatory view illustrating an example of a cross section of an engine to which the present invention is applied.

FIG. 1 illustrates an example of a cross section of an engine to which the present invention is applied. An engine 1 is a spark ignition 4-cycle gasoline engine, and a combustion chamber is formed by an engine head, a cylinder 13, a piston 14, a suction valve 15, and an exhaust valve 16. In the engine 1, a fuel injection valve 18 is provided at the engine head, and an injection nozzle of the fuel injection valve 18 penetrates into the combustion chamber. In this manner, a so-called in-cylinder direct injection type internal combustion engine is configured. An ignition plug 17 is also provided at the engine head. A combustion air is taken into the combustion chamber through an air cleaner 19, a throttle valve 20, and a suction port 21. The burnt gas (exhaust gas) discharged from the combustion chamber is discharged to the atmosphere through an exhaust port 24 and a catalytic converter 25.

The amount of the air taken into the combustion chamber is measured by an air flow sensor 22 provided on the upstream side of the throttle valve 20. The air-fuel ratio of the gas (exhaust gas) discharged from the combustion chamber is detected by an air-fuel ratio sensor 27 provided on the upstream side of the catalytic converter 25. A knock sensor 10 is provided in a cylinder block (not illustrated) having a structure in which the cylinder 13 and a crank case are integrated. The knock sensor 10 outputs a detection signal corresponding to a knock state quantity in the combustion chamber.

A so-called exhaust gas recirculation system (EGR system) in which the exhaust port 24 and the suction port 21 communicate with each other by an EGR pipe 28, and a portion of the exhaust gas flowing through the exhaust port 24 is brought back into the suction port 21 is configured. The amount of the exhaust gas flowing through the EGR pipe 28 is adjusted by an EGR valve 29.

Furthermore, a timing rotor 26 (signal rotor) is provided in a shaft portion of a crankshaft 30. A crank angle sensor 11 (detection unit) disposed to face the timing rotor 26 (detection target unit) in the vicinity of the timing rotor 26 detects the rotation of the timing rotor 26 to detect the rotation and the phase of the crankshaft 30, that is, a crank rotational speed (engine rotational speed). Detection signals of the knock sensor 10 and the crank angle sensor 11 are taken into a controller 12, and are used when the controller 12 detects an operation state of the engine 1 or controls the operation. In the present specification, the crank rotational speed may be simply referred to as a "rotational speed".

The controller 12 outputs commands for an opening of the throttle valve 20, an opening of the EGR valve 29, a fuel injection timing and a fuel injection amount by the fuel injection valve 18, an ignition timing by the ignition plug 17, and the like, and controls the engine 1 to a predetermined operation state. As the controller 12, for example, an engine control unit (ECU) can be used.

Although FIG. 1 illustrates only a single cylinder to illustrate the configuration of the combustion chamber of the engine 1, the engine according to the embodiment of the present invention may be a multi-cylinder engine including a plurality of cylinders.

[Detection of Crank Rotational Speed] Here, detection of the crank rotational speed by the crank angle sensor will be described.

Figure 2:
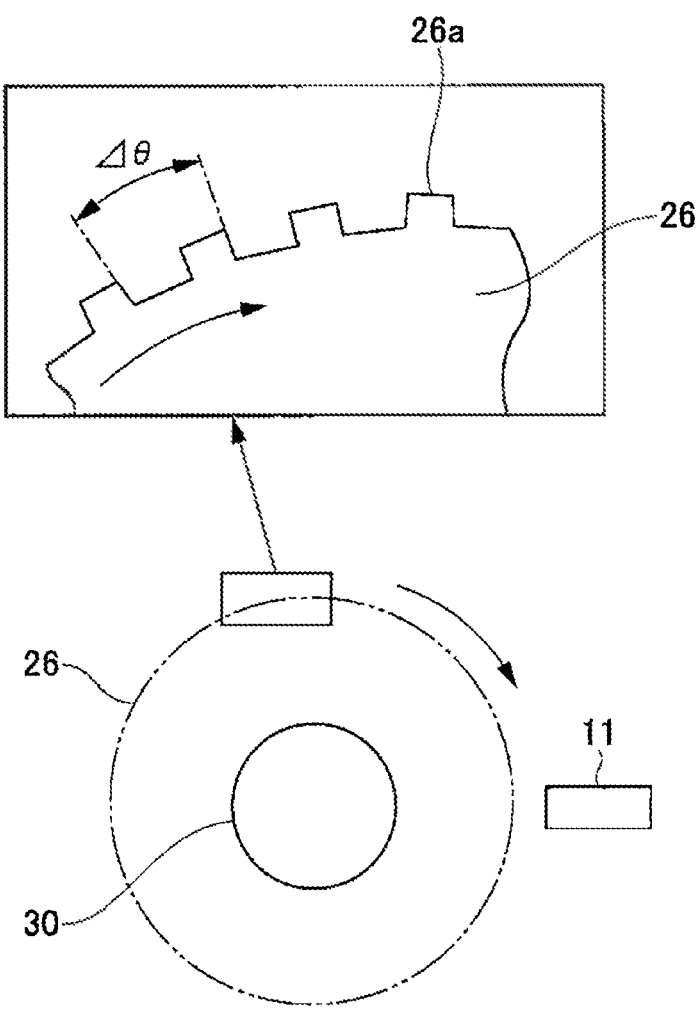
FIG. 2 is an explanatory diagram illustrating a principle of rotational speed detection by a crank angle sensor according to a first embodiment of the present invention.

FIG. 2 illustrates the principle of detecting the crank rotational speed by using the crank angle sensor 11 and the timing rotor 26.

Signal teeth 26a are provided at predetermined angular intervals $\Delta\theta$ on the outer periphery of the timing rotor 26 attached to the crankshaft 30 of the engine 1. The crank angle sensor 11 detects a time difference $\Delta t$ for which adjacent signal teeth 26a pass through a detection unit of the crank angle sensor 11, and thus a crank rotational speed $\omega=\Delta\theta/\Delta t$ [rad/s] is obtained. In the present embodiment, since such a principle is used, the crank rotational speed is detected for each rotation angle $\Delta\theta$, and the crank rotational speed becomes an average rotational speed between the rotation angles A.

[Configuration of Controller] Next, a configuration example of the controller 12 will be described.

Figure 3:
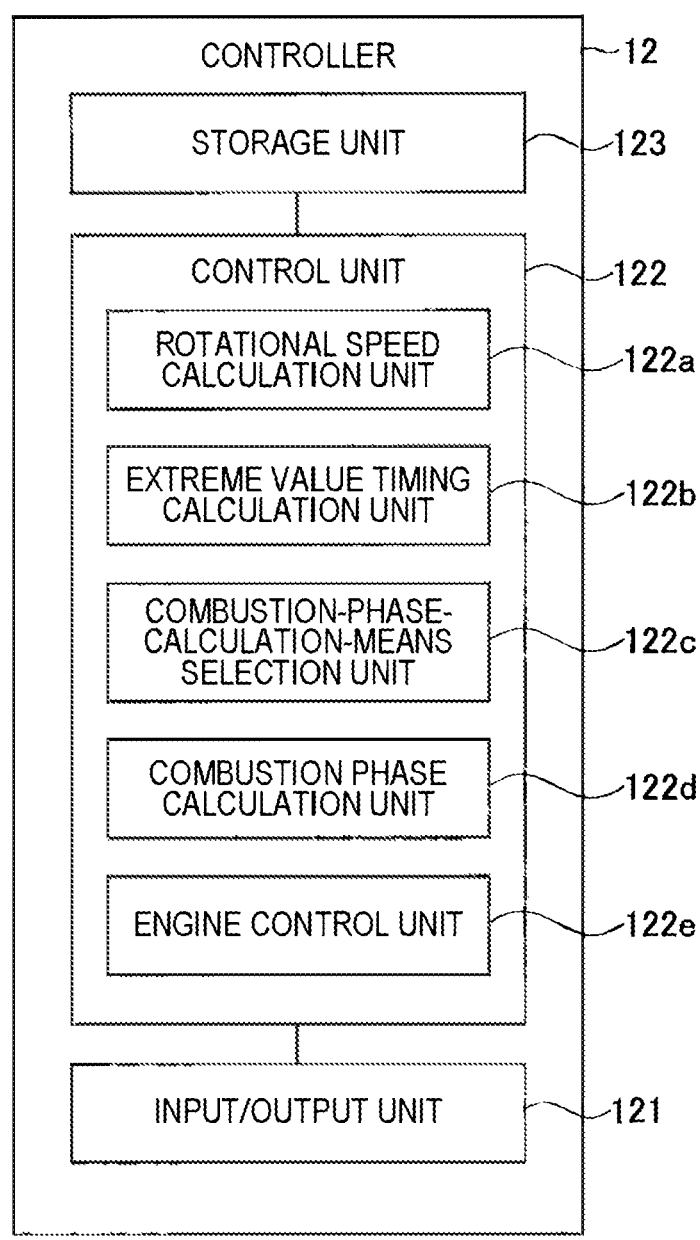
FIG. 3 is a block diagram illustrating a configuration example of a controller according to the first embodiment of the present invention.

FIG. 3 is a block diagram illustrating a configuration example of the controller 12. The controller 12 includes an input/output unit 121, a control unit 122, and a storage unit 123 which are electrically connected to each other via a system bus (not illustrated).

The input/output unit 121 includes an input port and an output port (not illustrated), and performs processes of an input and an output to and from each device and each sensor in a vehicle on which the engine 1 is mounted. For example, the input/output unit 121 reads a signal of the crank angle sensor and transmits the signal to the control unit 122. In addition, the input/output unit 121 outputs a control signal to each device in accordance with a command of the control unit 122.

The control unit 122 controls the engine 1 in accordance with the combustion state in the cylinder 13 of the engine 1. For example, the control unit 122 controls the ignition timing, the fuel injection timing, the fuel injection amount, the EGR valve opening, and the throttle valve opening, in accordance with the combustion phase in the cylinder 13 (the position of the crankshaft 30 when the combustion chamber is in a certain combustion state). The control unit 122 includes a rotational speed calculation unit 122a, an extreme value timing calculation unit 122b, a combustion-phase-calculation-means selection unit 122c, a combustion phase calculation unit 122d, and an engine control unit 122e.

The rotational speed calculation unit 122a calculates the crank rotational speed (engine rotational speed) of the engine 1 and obtains time-series data of the engine rotational speed. In addition, the rotational speed calculation unit 122a averages the time-series data of the engine rotational speed, removes harmonic components, and outputs the obtained time-series data of the engine rotational speed to the extreme value timing calculation unit 122b.

The extreme value timing calculation unit 122b obtains the crank angle at a timing when the rotational speed becomes the maximum value or the minimum value, from the time-series data of the engine rotational speed input from the rotational speed calculation unit 122a, and outputs the result to the combustion phase calculation unit 122d.

Figure 13:
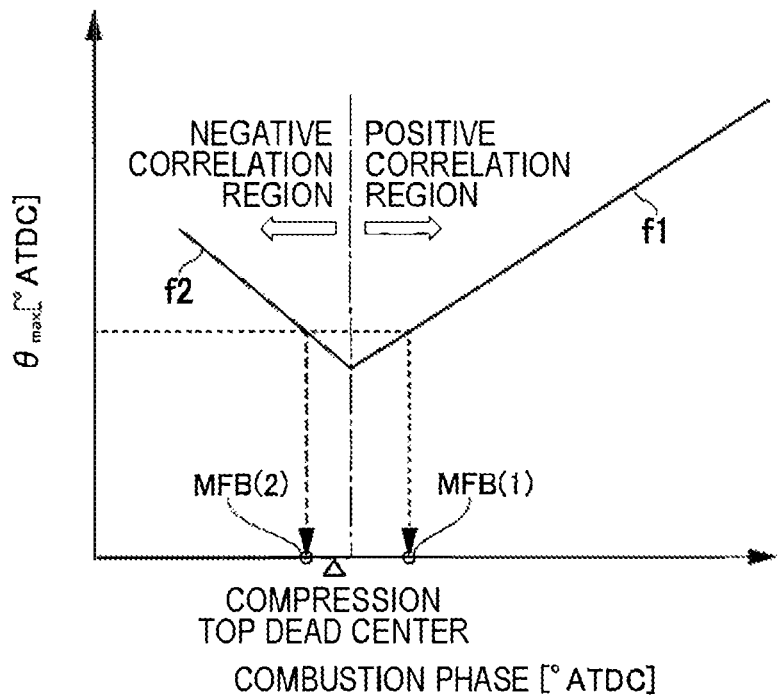
FIG. 13 is a characteristic diagram illustrating a relationship between a maximum speed timing and a combustion phase.

The combustion-phase-calculation-means selection unit 122c selects combustion phase calculation means (combustion phase calculation method, for example, calibration curves f1 and f2 in FIG. 13) for calculating the combustion phase (example of the combustion state) in the combustion chamber of the engine 1 from the operation state of the engine 1. Then, the combustion-phase-calculation-means selection unit 122c outputs the selection result to the combustion phase calculation unit 122d. Here, the information (operation state parameter) on the operation state of the engine 1 includes a control command value for the engine 1 and the like in addition to the information directly indicating the operation state of the engine 1.

The combustion phase calculation unit 122d estimates the combustion phase as the combustion state in the combustion chamber from the extreme value timing (crank angle) of the engine rotational speed obtained by the extreme value timing calculation unit 122b, by using the combustion phase calculation means selected by the combustion-phase-calculation-means selection unit 122c. The combustion phase calculation unit 122d outputs the estimated combustion phase in the combustion chamber to the engine control unit 122e. The combustion phase calculation unit 122d is an example of a combustion state estimation unit.

The engine control unit 122e controls the engine 1 based on the combustion phase in the combustion chamber of the engine 1, which is obtained by the combustion phase calculation unit 122d.

The storage unit 123 is a volatile memory such as a random access memory (RAM) or a nonvolatile memory such as a read only memory (ROM). A control program executed by an arithmetic processing device (not illustrated) provided in the controller 12, various parameters, threshold values, and the like are recorded in the storage unit 123. The arithmetic processing device reads the control program from the storage unit 123 and executes the control program, thereby the function of each block in the control unit 122 is realized. For example, a central processing unit (CPU) or a micro processing unit (MPU) can be used as the arithmetic processing device. The controller 12 may include a nonvolatile auxiliary storage device including a semiconductor memory or the like, and the control program may be stored in the auxiliary storage device.

[Overall Processing of Engine Control] Next, overall processing of engine control by the controller 12 will be described with reference to FIG. 4.

Figure 4:
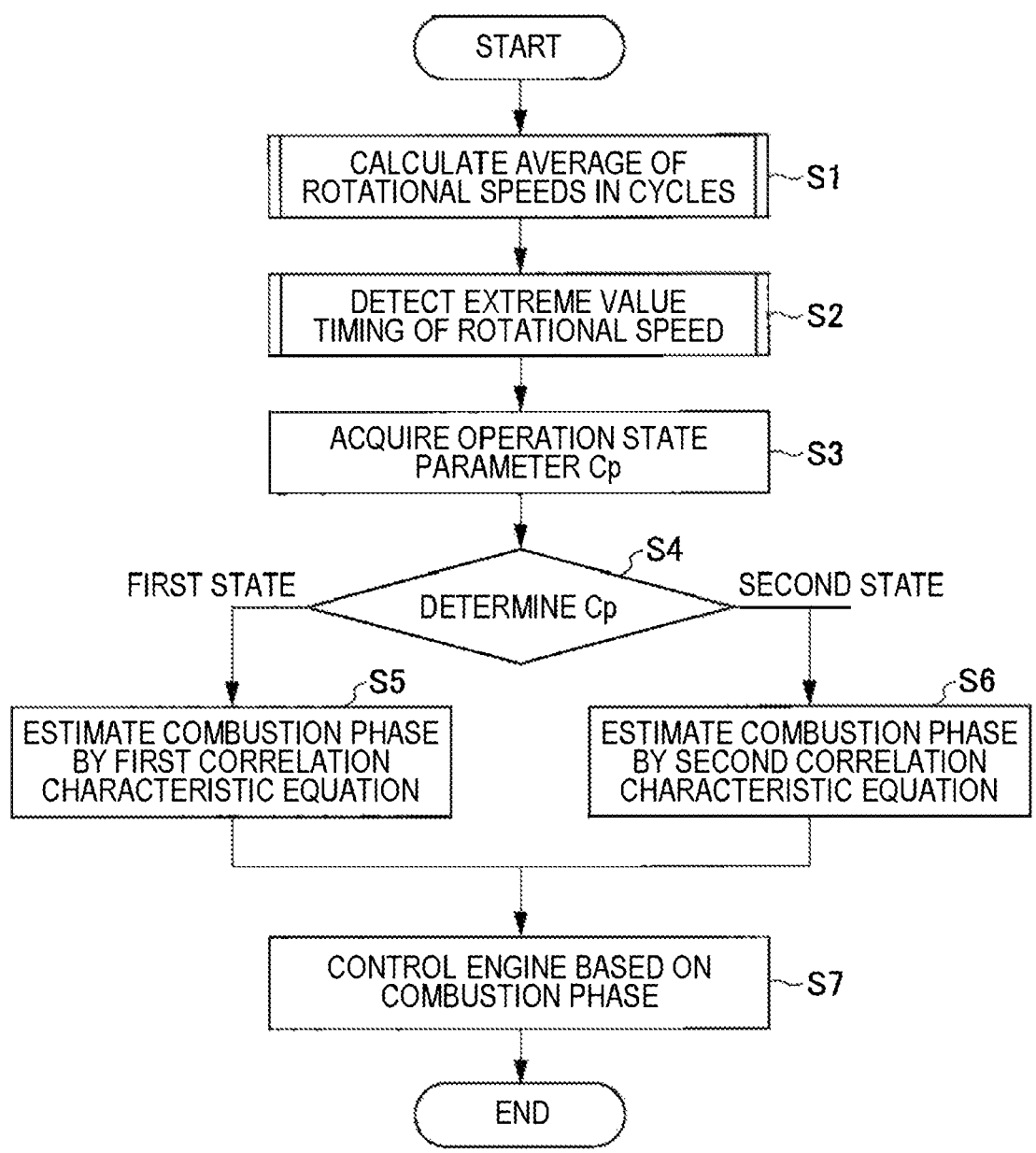
FIG. 4 is a flowchart illustrating a procedure example of overall processing of engine control by the controller according to the first embodiment of the present invention.

FIG. 4 is a flowchart illustrating a procedure example of the overall processing of the engine control by the controller 12. First, the rotational speed calculation unit 122a calculates an average value of the engine rotational speeds at a plurality of cycles from the time-series data of the rotational speed of the engine 1 (S1). In the present specification and the drawings, an average value of engine rotational speeds of a plurality of cycles is referred to as a "cycle average rotational speed". Details of the process of Step S1 will be described with reference to FIG. 5.

Then, the extreme value timing calculation unit 122*b* detects the extreme value timing of the engine rotational speed (S2). Details of the process of Step S2 will be described with reference to FIG. 5.

Then, the combustion-phase-calculation-means selection unit 122*c* acquires an operation state parameter Cp (S3). The combustion-phase-calculation-means selection unit 122*c* determines whether the operation state parameter Cp is in a first state or a second state (S4).

In a case where the combustion-phase-calculation-means selection unit 122*c* determines that the operation state parameter Cp is in the first state, the combustion phase calculation unit 122*d* estimates the combustion phase by a first correlation characteristic equation (first combustion phase calculation means) (S5). In a case where the combustion-phase-calculation-means selection unit 122*c* determines that the operation state parameter Cp is in the second state, the combustion phase calculation unit 122*d* estimates the combustion phase by a second correlation characteristic equation (second combustion phase calculation means) (S6).

Then, after completion of Step S5 or S6, the engine control unit 122*e* controls the engine 1 based on the estimated combustion phase in the combustion chamber (S7). After the process of Step S7, a series of processes of this flowchart is ended.

[Rotational Speed Calculation Unit] Next, a rotational speed calculation process (Step S1) by the rotational speed calculation unit 122*a* of the controller 12 will be described with reference to FIG. 5.

Figure 5:
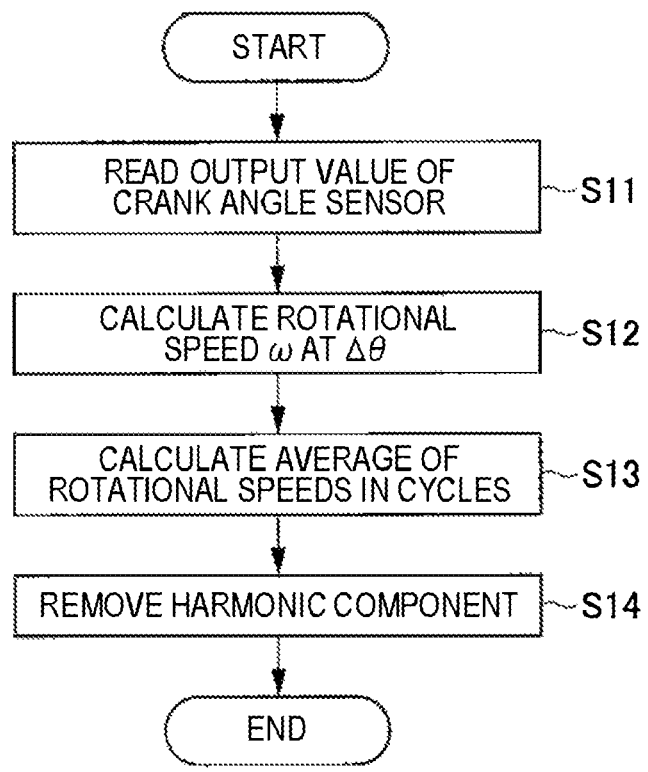
FIG. 5 is a flowchart illustrating a procedure example of a rotational speed calculation process by a rotational speed calculation unit of the controller according to the first embodiment of the present invention.

FIG. 5 is a flowchart illustrating a procedure example of the process by the rotational speed calculation unit 122*a*. First, the rotational speed calculation unit 122*a* reads the output value of the crank angle sensor 11 at a predetermined sampling period (S11). Then, the rotational speed calculation unit 122*a* calculates the rotational speed ω in Δθ from the output value of the crank angle sensor 11 at predetermined angular intervals Δθ, and writes the rotational speed ω in a storage region Mω (i) on the RAM (S12).

By repeating the processes of Steps S11 and S12 during one cycle (crank angle 0 to 720°), the time-series data ω (i) of the rotational speed for one cycle is obtained. Here, a possible range of i is represented by 1 to 720/Δθ. For example, in a case of Δθ=10°, the time-series data ω (i) of the rotational speed including a total of 72 points (i=1 to 72) from the crank angle of 10° to 720° is obtained in the storage region Mω (i). Then, the rotational speed calculation unit 122*a* executes the processes of Steps S11 and S12 over a plurality of cycles.

Then, the rotational speed calculation unit 122*a* obtains time-series data of the cycle average engine rotational speed from the time-series data of the rotational speed of the engine 1 detected by the crank angle sensor 11 (S13). This is to prevent the estimated result of the combustion state from being adversely affected in a case where the engine rotational speed varies for each cycle.

Here, a specific method of obtaining the time-series data of the cycle average engine rotational speed will be described with reference to FIG. 6.

Figure 6:
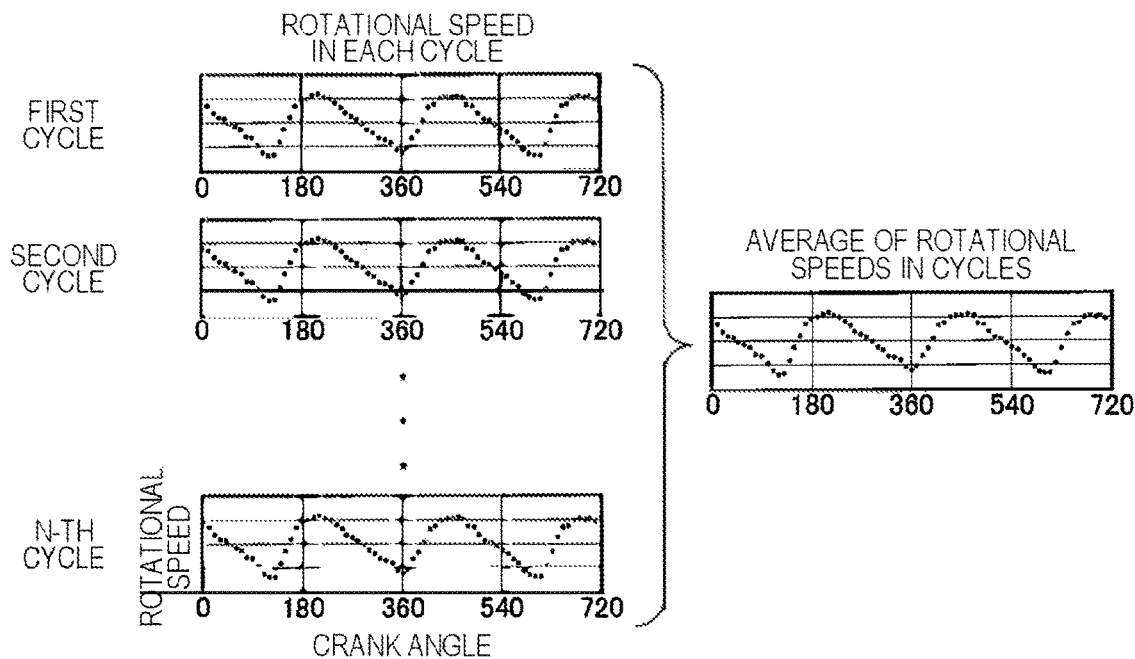
FIG. 6 is an explanatory diagram illustrating a method of obtaining time-series data of a cycle average rotational speed according to the first embodiment of the present invention.

FIG. 6 illustrates the method of obtaining the time-series data of the cycle average engine rotational speed. The rotational speed calculation unit 122*a* takes the time-series data of the engine rotational speed obtained for each predetermined crank angle (As) by the crank angle sensor 11, as time-series data of the engine 1 for one cycle (period for the crank angle of 720°). For example, in the case of Δθ=10°, the rotational speed calculation unit 122*a* takes the time-series data of the rotational speed including a total of 72 points from the crank angle of 10° to 720°. The left diagram in FIG. 6 illustrates an example of the time-series data of the rotational speed for each cycle, which has taken in this manner.

Taking the time-series data of the rotational speed for each cycle is repeated a predetermined number N of cycles (for example, 100 cycles), and the time-series data of the cycle average engine rotational speed is obtained by Equation (1). By averaging the values of the engine rotational speed at the respective discrete points (crank angles) at the predetermined number N of cycles, time-series data of the engine rotational speed in which a cycle variation illustrated in the right diagram in FIG. 6 is removed is obtained.

[Equation 1]

$$\omega(\theta)_{AVE} = \frac{\sum_{i=1}^{N} \omega(\theta)_i}{N} \quad (1)$$

ω: rotational speed
θ: crank angle
N: number of cycles of target to be averaged
i: cycle number Returning to FIG. 5, the procedure of the process by the rotational speed calculation unit 122*a* will be continuously described. Then, the rotational speed calculation unit 122*a* obtains time-series data of the engine rotational speed ω in which harmonic components are removed from the time-series data of the cycle average engine rotational speed (S14). The rotational speed calculation unit 122*a* executes the processes of Steps S11 to S14 at predetermined time intervals.

This harmonic component removal process is executed to remove a fluctuation component which is not related to combustion, from the engine rotational speed. Examples of the fluctuation component of the rotational speed, which is not related to the combustion include rotational fluctuation due to mechanical swinging of a load of the engine 1, variation in a rotational speed detection value due to processing variation (pitch error) of the signal tooth 26*a* of the timing rotor 26, electrical noise included in the signal of the crank angle sensor 11, and the like. The above fluctuation components are generally short-period fluctuations compared to engine rotation fluctuations generated by torque generated by combustion (referred to as "combustion torque" below), and thus can be reduced by removing harmonic components from rotational speed data. By removing the fluctuation component that is not related to the combustion from the rotational speed data, it is possible to improve the estimation accuracy in the estimation of the combustion state based on the engine rotation fluctuation.

In order to remove the harmonic components from the rotational speed data, the rotational speed calculation unit 122*a* reconstructs time-series data of the engine rotational speed by using Fourier series expansion represented by Equation (2). In the Fourier series expansion, the original function is reconstructed by adding trigonometric functions of different frequencies.

[Equation 2]

$$\omega(\theta)' = \omega_0 + \sum_{k=1}^{n} \left\{ c_k \cos\frac{k \cdot 2\pi(\theta - \theta_0)}{\Theta} + s_k \sin\frac{k \cdot 2\pi(\theta - \theta_0)}{\Theta} \right\} \quad (2)$$

-continued $$c_k = \frac{2}{\Theta} \int_{\theta_0}^{\theta_0+\Theta} \omega(\theta)_{AVE} \cos\frac{k \cdot 2\pi(\theta - \theta_0)}{\Theta} d\theta$$

$$s_k = \frac{2}{\Theta} \int_{\theta_0}^{\theta_0+\Theta} \omega(\theta)_{AVE} \sin\frac{k \cdot 2\pi(\theta - \theta_0)}{\Theta} d\theta$$

$\omega(\theta)_{AVE}$: original cycle average rotational speed
$\omega(\theta)'$: reconstructed cycle average rotational speed
k: order of trigonometric function
θ: crank angle
Θ: cycle period In Equation (2), k is the order of the trigonometric function, and the trigonometric function having a frequency that increases as the k becomes more is obtained. Therefore, when the time-series data of the engine rotational speed is reconstructed by using the Fourier series expansion, if the addition of the trigonometric functions is terminated at an appropriate order, a frequency component higher than the order can be removed from the original time-series data.

In a general three-cylinder or four-cylinder four-cycle gasoline engine, a termination order n of a trigonometric function for removing harmonic components that are not related to combustion from time-series data of a rotational speed is desirably about 3 to 5. However, it is considered that the appropriate termination order n changes depending on the configuration of the engine and the operating conditions.

For example, if the number of cylinders of the engine increases, the frequency of the fluctuation in the engine rotational speed due to the fluctuation of the combustion torque increases. Thus, it is preferable to increase the termination order in order to appropriately reconstruct the fluctuation component. In addition, even in a case where the engine rotational speed increases, the frequency of the fluctuation of the engine rotational speed due to the fluctuation of the combustion torque increases, and thus, it is preferable to further increase the termination order. Therefore, if the termination order n of the trigonometric function in the Fourier series expansion is changed based on the number of cylinders and the engine rotational speed, it is possible to improve the estimation accuracy over a wide operation range in the estimation of the combustion state based on the fluctuation of the engine rotational speed.

As described above, the rotational speed calculation unit 122a reconstructs the time-series value of the crank rotational speed by performing finite-ordered Fourier series expansion on the time-series value (time-series data) of the crank rotational speed obtained from the crank angle sensor 11. In addition, it is desirable to change the termination order of the Fourier series expansion based on the crank rotational speed.

Figure 7:
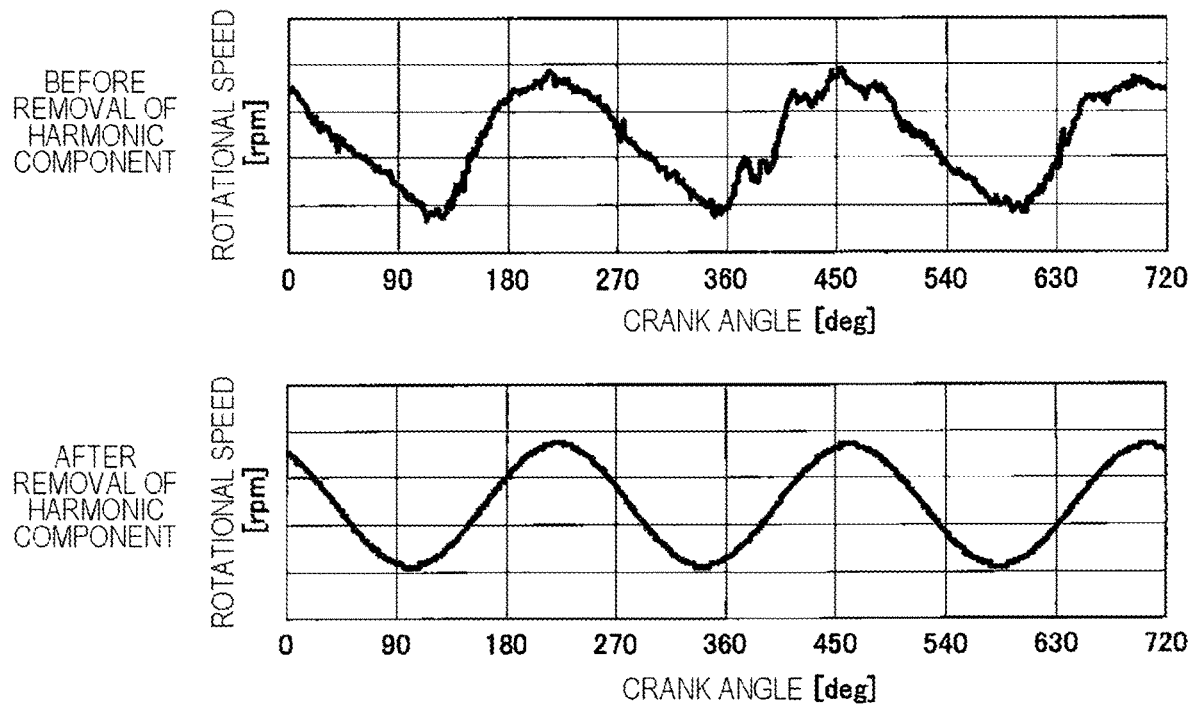
FIG. 7 is an explanatory diagram illustrating an example of time-series data of a crank rotational speed before and after removing a harmonic component, according to the first embodiment of the present invention.

FIG. 7 illustrates an example of the time-series data of the crank rotational speed before and after the harmonic component is removed. FIG. 7 illustrates an example of a three-cylinder four-cycle engine as an example of time-series data of a rotational speed of the engine 1 for one cycle (crank angle 0 to 720°).

The upper side of FIG. 7 is an example of time-series data (before removal of a high-frequency component) of the rotational speed in a case where a harmonic component is included in the rotational speed obtained from the crank angle sensor 11. The lower side of FIG. 7 is an example of the time-series data of the rotational speed (after the removal of the high-frequency component) in a case where the time-series data of the rotational speed in the upper side of FIG. 7 is subjected to Fourier series expansion using Equation (2) and the addition of the trigonometric functions is terminated at the fourth order. In the upper side of FIG. 7 and the lower side of FIG. 7, the horizontal axis indicates the crank angle [deg], and the vertical axis indicates the rotational speed [rpm].

In this example, by reconstructing the time-series data of the rotational speed using the Fourier series expansion, the high-frequency fluctuation component is removed, and only the low-frequency fluctuation component having the cycle of 240° is extracted. The low-frequency rotational speed fluctuation is generated because the combustion torque acting on the crankshaft fluctuates with the intermittent combustion for each cylinder. Therefore, the fluctuation cycle is the same as the explosion cycle of the engine. For example, in the three-cylinder four-cycle engine, the fluctuation cycle is 240° (720°/3). In the four-cylinder four-cycle engine, the fluctuation cycle is 180° (720°/4).

The extreme value timing calculation unit 122b divides the period of the time-series value (time-series data) of the crank rotational speed in the period for the crank angle of 720° by the number of cylinders, and assigns the time-series value of the crank rotational speed in a period including the compression top dead center of each cylinder, as the time-series value of the crank rotational speed in the corresponding cylinder. In addition, the extreme value timing calculation unit 122b desirably calculates the extreme value timing of the crank rotational speed for each cylinder from the time-series value of the crank rotational speed assigned to each cylinder. In addition, it is desirable that the extreme value timing calculation unit 122b approximates the time-series value of the crank rotational speed from the discrete time-series value of the crank rotational speed by using a continuous function, and calculates the extreme value timing of the crank rotational speed by using the continuous function.

[Extreme Value Timing Calculation Unit] Next, an extreme value timing calculation process (Step S2) by the extreme value timing calculation unit 122b of the controller 12 will be described with reference to FIG. 8.

Figure 8:
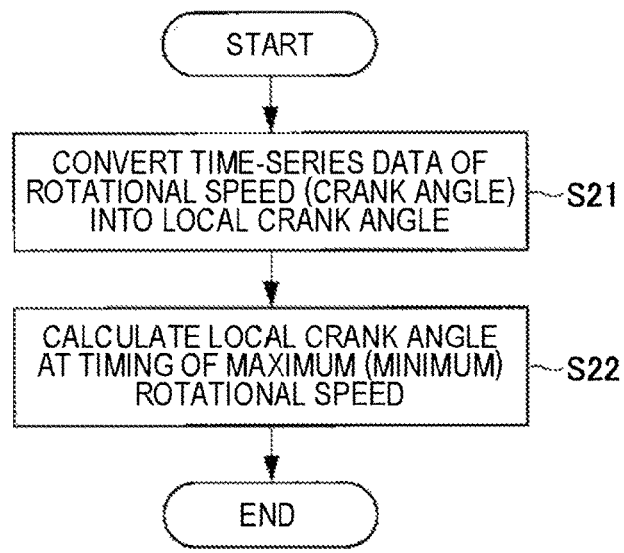
FIG. 8 is a flowchart illustrating a procedure example of a process by an extreme value timing calculation unit of the controller according to the first embodiment of the present invention.

FIG. 8 is a flowchart illustrating a procedure example of the process by the extreme value timing calculation unit 122b. The extreme value timing calculation unit 122b converts the time-series data of the engine rotational speed for the entire cycle, that is, one cycle (crank angle 0 to 720°) of the engine 1, into a local crank angle synchronized with the cycle of each cylinder (S21). The conversion process of the local crank angle will be described later with reference to FIGS. 10 and 11.

Then, the extreme value timing calculation unit 122b calculates the local crank angle at a timing at which the engine rotational speed becomes the maximum (or minimum) speed, from the time-series data of the engine rotational speed converted into the local crank angle (S22). After the process of Step S22, this flowchart is ended.

(Conversion Process of Local Crank Angle) Here, the conversion process (S21) of the local crank angle in the extreme value timing calculation unit 122b will be described with reference to FIGS. 9 to 11.

Figure 9:
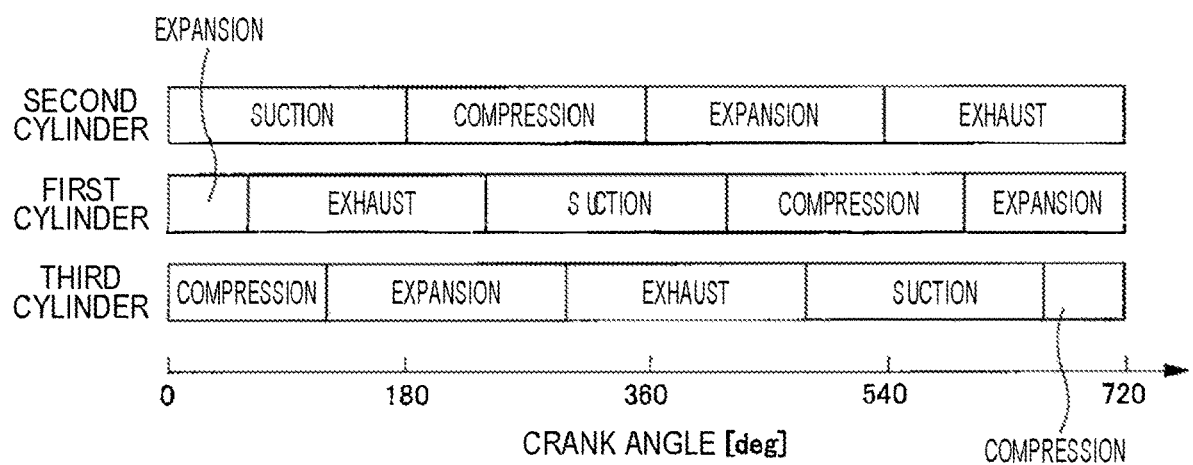
FIG. 9 is an explanatory diagram illustrating an example of a stroke sequence of a three-cylinder four-cycle engine.

FIG. 9 illustrates a sequence of each stroke in the three-cylinder four-cycle engine. In a four-cycle engine, four strokes of suction, compression, expansion, and exhaust are performed in order. In a three-cylinder engine, the stroke between the cylinders is shifted by a crank angle of 240°. When the ignition of the engine is assumed to be performed in the order of a second cylinder, a first cylinder, and a third cylinder, the stroke of the first cylinder is delayed from the second cylinder by 240°, and the stroke of the third cylinder is delayed from the first cylinder by 240°.

The state of combustion is strongly reflected in the crank rotational speed in the vicinity of the compression top dead center of each cylinder, in which the in-cylinder pressure becomes maximum. Therefore, in Step S21, the time-series data of the rotational speed for the entire cycle (crank angle of 0 to 720°) is divided in a section (window) of the crank angle of 240° around the compression top dead center of each cylinder. The rotational speed data including the compression top dead center of the corresponding cylinder is assigned to each window.

Figure 10:
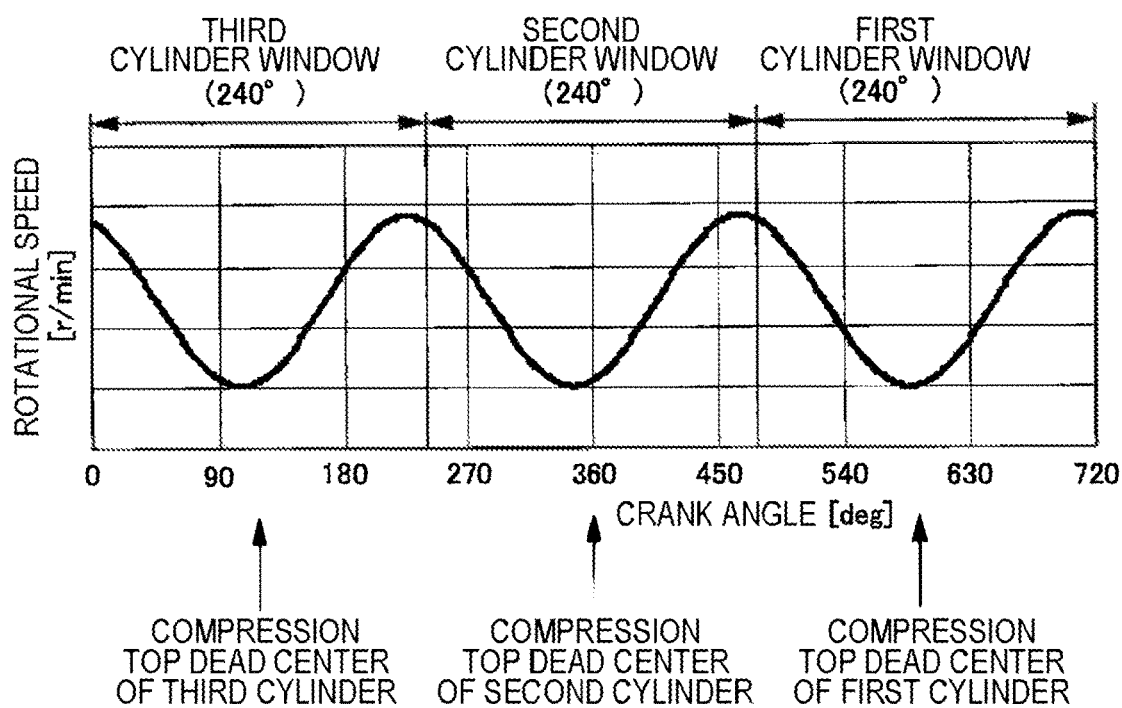
FIG. 10 is an explanatory diagram illustrating an example in which a window is set for each cylinder of the three-cylinder four-cycle engine according to the first embodiment of the present invention.

FIG. 10 illustrates an example in which a window having a width of 240° around the compression top dead center of each cylinder is set for time-series data of the engine rotational speed for one cycle in a three-cylinder four-cycle engine. Since the section with the crank angle of 0 to 240° includes the compression top dead center of the third cylinder, this is assigned as a third cylinder window. Similarly, a section with the crank angle of 240 to 480° is assigned as a second cylinder window, and a section with the crank angle of 480 to 720° is assigned as a first cylinder window.

When each window is assigned to the time-series data of the rotational speed in this manner, the combustion state of the third cylinder is strongly reflected in the rotational speed data of the third cylinder window, as compared with the rotational speed data of other cylinder windows. Similarly, the combustion state of the second cylinder is strongly reflected in the rotational speed data of the second cylinder window, as compared with the rotational speed data of other cylinder windows. Further, the combustion state of the first cylinder is strongly reflected in the rotational speed data of the first cylinder window, as compared with the rotational speed data of other cylinder windows. Therefore, it is possible to estimate the combustion state for each cylinder by using the rotational speed data of each window.

Further, in Step S21, the crank angle of the time-series data of the rotational speed in each window is converted into a local crank angle based on the compression top dead center (ATDC 0°) of each cylinder.

Figure 11:
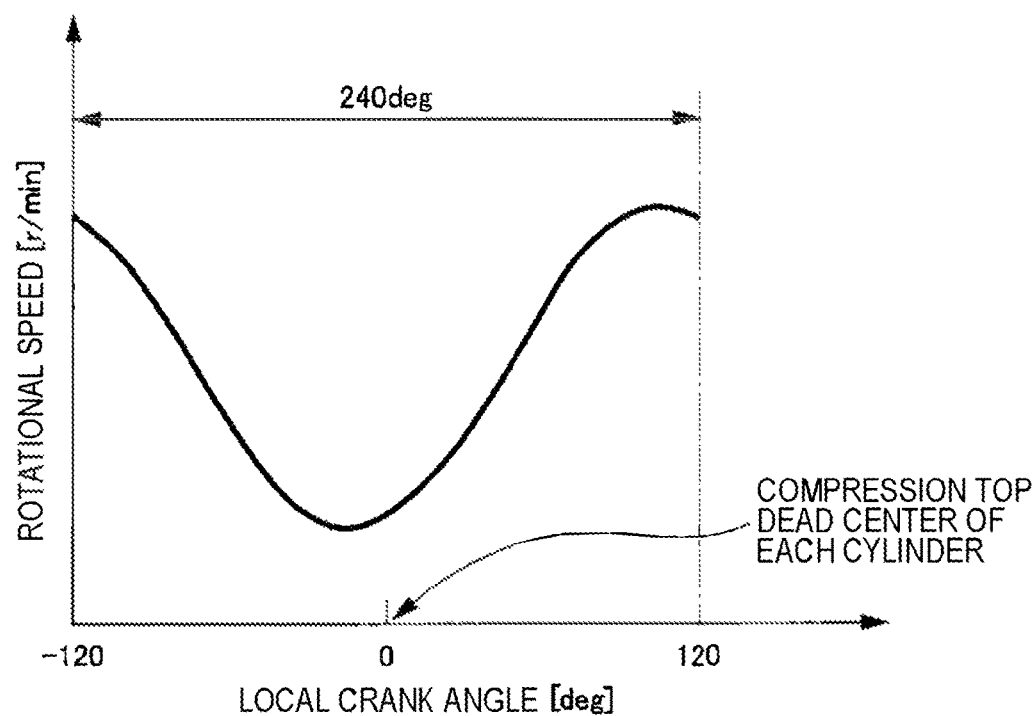
FIG. 11 is an explanatory diagram illustrating an example in which time-series data (crank angle) of a rotational speed in the window is converted into a local crank angle, according to the first embodiment of the present invention.

FIG. 11 illustrates an example in which time-series data (crank angle) of the rotational speed in the window is converted into a local crank angle. In this example, the time-series data of the rotational speed is redefined using the local crank angle of −120 to 120° in which the compression top dead center of each cylinder is set to zero. In Step S21, the time-series data of the rotational speed converted into the local crank angle is created for all the cylinder windows, and the data is delivered to Step S22.

Subsequently, in Step S22, a timing at which the rotational speed becomes the maximum or a timing at which the rotational speed becomes the minimum is calculated from the time-series data of the rotational speed converted into the local crank angle. The local crank angle for obtaining the extreme value (rotation phase) of the rotational speed is not limited to the vicinity of the compression top dead center (0°), and, for example, the extreme value of the rotational speed may be obtained in the vicinity of the local crank angle of 120°.

As described above, in the internal combustion engine control device (controller 12) according to the present embodiment, the extreme value timing calculation unit (extreme value timing calculation unit 122b) divides the period (0 to 720°) of one cycle of the time-series value of the crank rotational speed by the number of cylinders (for example, 3) of the internal combustion engine (engine 1) so as to include the crank angle corresponding to the compression top dead center of each cylinder (see FIG. 10). Then, the extreme value timing calculation unit assigns the time-series value of the crank rotational speed in the divided period (range of) 240° as the time-series value of the crank rotational speed in the corresponding cylinder, and converts the time-series data of the time-series value of the crank rotational speed assigned to each cylinder into time-series data with the crank angle corresponding to the compression top dead center of each cylinder as a reference (0°) (see FIG. 11). Then, after the conversion of the time-series data is performed for each cylinder, the extreme value timing calculation unit calculates the extreme value timing of the crank rotational speed (for example, the local crank angle $\theta_{max}$ in FIG. 12) for each cylinder from the time-series value of the crank rotational speed assigned to each cylinder.

(Calculation of Maximum (Minimum) Timing of Rotational Speed)

Figure 12:
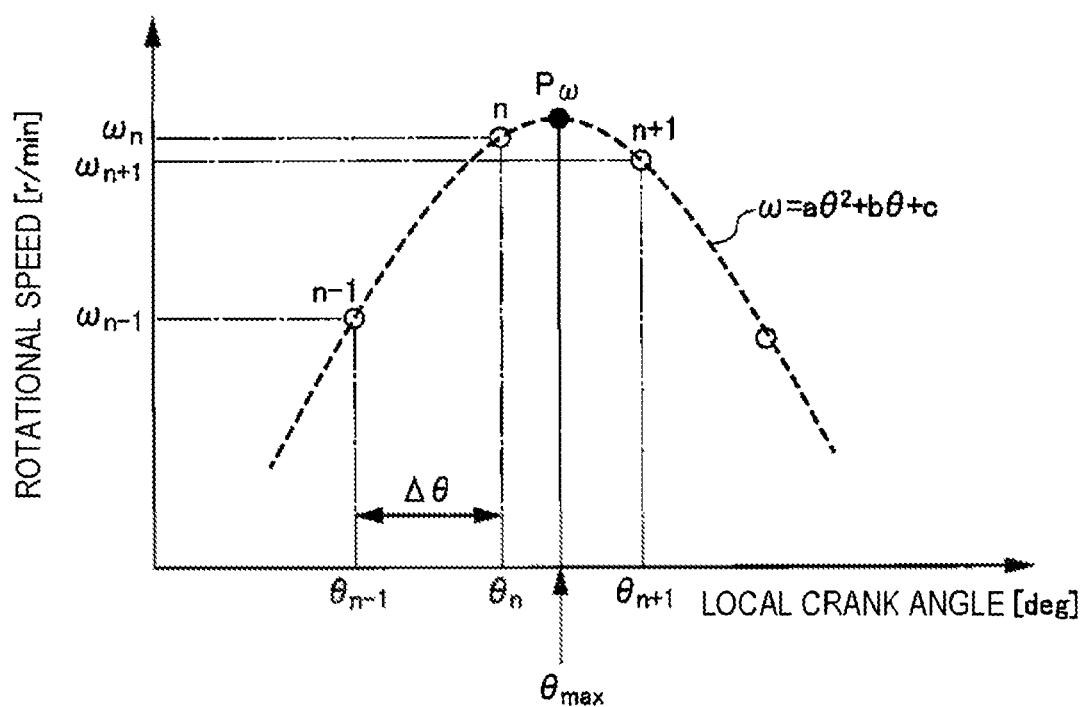
FIG. 12 is an explanatory diagram illustrating an example of a method of calculating the maximum timing of an engine rotational speed according to the first embodiment of the present invention.

FIG. 12 illustrates an example of a method of calculating the maximum (minimum) timing of the engine rotational speed in Step S22.

Since the time-series data of the rotational speed is discrete point data, as illustrated in FIG. 12, a deviation occurs between the maximum timing (data point n) of the rotational speed in the discrete point data and the maximum timing of the actual rotational speed (rotational speed indicated by a broken line). Thus, in Step S22, the time-series change of the rotational speed is approximated by a polynomial from the discrete point data, and the maximum timing of the rotational speed is obtained from this approximate equation.

Therefore, in Step S22, first, a data point n at which the rotational speed becomes the maximum is searched from the time-series data of the rotational speed which is discrete point data. The local crank angle $\theta_n$ and the rotational speed $\omega_n$ at the data point n, the local crank angle $\theta_{n-1}$ and the rotational speed $\omega_{n-1}$ at a data point (n−1) of one discrete point (one time point before) of the data point n, and the local crank angle $\theta_{n+1}$ and the rotational speed $\omega_{n+1}$ at a data point (n+1) after one discrete point of the data point n are extracted.

Furthermore, in Step S22, the rotational speed ω is approximated by Equation (3) that is a quadratic function of the local crank angle θ. Here, a, b, and c are constants. In Step S22, the constants a, b, and c are obtained by solving simultaneous ternary linear equations obtained by substituting $\theta_n$, $\omega_n$, $\theta_{n-1}$, $\omega_{n-1}$, $\theta_{n+1}$ and $\omega_{n+1}$ into Equation (3).

[Equation 3]

$$\omega = a\theta^2 + b\theta + c \tag{3}$$

At a point at which the rotational speed ω becomes the extreme value, the differential value of Equation (3) becomes zero. Thus, in Step S22, the extreme value timing calculation unit 122b obtains the local crank angle $\theta_{max}$ (maximum speed timing) at which the rotational speed ω becomes the maximum, by Equation (4) which is a differential equation of Equation (3). The local crank angle $\theta_{max}$ of the maximum speed timing of each cylinder is obtained by a similar procedure, and the local crank angle $\theta_{max}$ is delivered to the combustion phase calculation unit 122d. $P_\omega$ illustrated in FIG. 12 is a maximum speed point obtained by approximation (interpolation) using a quadratic function.

[Equation 4]

$$\frac{d\omega}{d\theta} = 2a\theta_{max} + b = 0 \quad (4)$$

$$\theta_{max} = -\frac{b}{2a}$$

In addition, in a case where the minimum timing of the rotational speed is obtained in Step S22, a data point n at which the rotational speed becomes the minimum is searched from the time-series data of the rotational speed which is discrete point data. The minimum timing of the rotational speed is obtained using a method similar to the case of obtaining the maximum timing of the rotational speed.

In the present embodiment, the rotational speed $\omega$ is approximated by a quadratic function of the local crank angle $\theta$, but the present invention is not limited thereto. For example, the rotational speed $\omega$ can be approximated using various continuous functions such as a cubic function and a trigonometric function of the local crank angle $\theta$.

[Combustion Phase Calculation Unit] Next, a method of calculating the combustion phase by the combustion phase calculation unit 122d of the controller 12 will be described with reference to FIG. 13.

FIG. 13 illustrates a correlation between the maximum speed timing (local crank angle $\theta_{max}$) of the engine rotational speed and the combustion phase. The "combustion phase" can be defined as, for example, the crank angle at which a mass fraction burned (MFB) becomes a predetermined value. Specific examples of the combustion phase include a crank angle at which the mass fraction burned is 10% (MFB 10), a crank angle at which the mass fraction burned is 50% (MFB 50), and a crank angle at which the mass fraction burned is 90% (MFB 90). MFB 50 is referred to as a combustion centroid. In the present embodiment, the crank angle at a time of the MFB 50 is assumed as the combustion phase, but the present invention is not limited to this example.

The inventors have found that there is a strong correlation between the extreme value timing of the engine rotational speed (for example, the local crank angle $\theta_{max}$) and the combustion phase. As illustrated in FIG. 13, if the combustion phase is retarded from the vicinity of the compression top dead center indicated by a triangle, the maximum speed timing of the engine rotational speed (local crank angle $\theta_{max}$) and the combustion phase have positive correlation (calibration curve f1). That is, if the combustion phase is retarded, the maximum speed timing (local crank angle $\theta_{max}$) is retarded. A region showing such a characteristic is defined as a "positive correlation region". The calibration curve f1 in the positive correlation region is an example of the combustion phase calculation means. The vicinity of the compression top dead center means that the crank angle is within a range of a predetermined angle from the compression top dead center (ATDC 0°), and is, for example, ATDC 2°.

On the other hand, if the combustion phase is advanced from the vicinity (for example, ATDC 2°) of the compression top dead center, the maximum speed timing of the engine rotational speed (local crank angle $\theta_{max}$) and the combustion phase have a negative correlation (calibration curve f2). That is, if the combustion phase is advanced, the maximum speed timing (local crank angle $\theta_{max}$) is retarded. A region showing such a characteristic is defined as a "negative correlation region". The calibration curve f2 in the negative correlation region is another example of the combustion phase calculation means.

The correlation characteristic between the maximum speed timing (local crank angle $\theta_{max}$) of the engine rotational speed and the combustion phase is obtained in advance as a calibration curve. The calibration curve is not necessarily an equation (correlation characteristic equation), and may be, for example, a reference table (correlation characteristic table) in which the maximum speed timing of the rotational speed (local crank angle $\theta_{max}$) is used as an index. The correlation characteristic is obtained in advance by performing a combustion experiment, calibration, or the like in a target engine, and is stored in a nonvolatile memory such as the storage unit 123 of the controller 12 in a form of a correlation characteristic equation or a correlation characteristic table. In FIG. 13, the correlation characteristics represented by the calibration curves f1 and f2 are linear (relationship represented by a linear equation), but may be non-linear in accordance with the characteristics of the engine 1.

Figure 14:
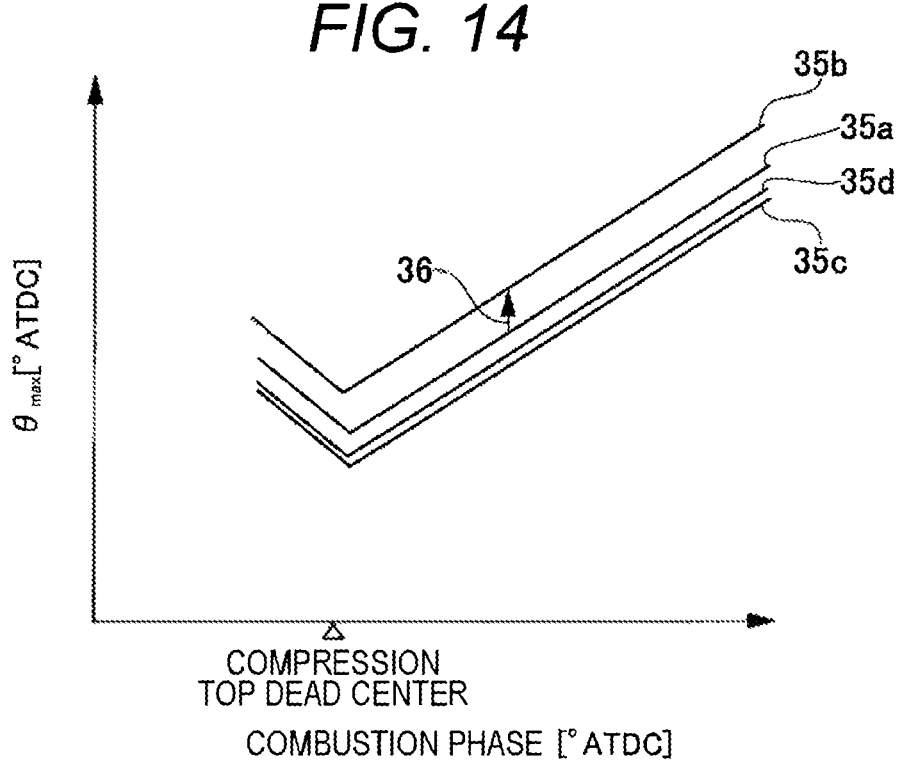
FIG. 14 is a characteristic diagram illustrating a relationship example between the combustion phase and the maximum speed timing for each cylinder.

(Calibration Curve Different for Each Cylinder) In a case of a multi-cylinder engine, as illustrated in FIG. 14, a calibration curve (correlation characteristic equation and correlation characteristic table) different from each cylinder may be used. FIG. 14 illustrates an example of the calibration curve of the 4-cylinder engine, and calibration curves 35a, 35b, 35c, and 35d indicate the calibration curves of the first cylinder, the second cylinder, the third cylinder, and the fourth cylinder, respectively.

(Basic Calibration Curve and Offset Value) Alternatively, a basic calibration curve (for example, the calibration curve 35a) common between the cylinders and an offset value 36 from the basic calibration curve may be stored in the storage unit 123 for each cylinder, and the calibration curve of each cylinder may be obtained from the basic calibration curve (the calibration curve 35a) and the offset value 36 for each cylinder. The calibration curve of another cylinder or an average calibration curve obtained from a plurality of cylinders may be set as the basic calibration curve, not limited to the first cylinder.

As described above, the internal combustion engine control device (controller 12) according to the present embodiment includes, as the combustion state calculation means, a first correlation characteristic (calibration curve f1) in which the combustion phase representing the combustion state and the extreme value timing of the crank rotational speed show a positive correlation, and a second correlation characteristic (calibration curve f2) in which the combustion phase representing the combustion state and the extreme value timing of the crank rotational speed show a negative correlation.

In the internal combustion engine control device (controller 12) according to the present embodiment, the combustion state calculation means is configured as a correlation characteristic equation or a reference table based on the first correlation characteristic (calibration curve f1) and the second correlation characteristic (calibration curve f2), which are set for each of a plurality of cylinders of the internal combustion engine (engine 1). The combustion-state-calculation-means selection unit (combustion-phase-calculation-means selection unit 122c) switches or corrects the correlation characteristic equation or the reference table (calibration curves 35a to 35d) (basic calibration curve 35a and offset value 36) corresponding to the cylinder of which the combustion state (combustion phase) is calculated.

In a multi-cylinder engine, a timing at which the crank rotational speed (engine rotational speed) changes is not necessarily at equal intervals due to manufacturing tolerances of the engine, twisting of the crankshaft, variations in combustion characteristics between cylinders, and the like. Thus, by changing the correlation characteristic (calibration curve) between the extreme value timing of the engine rotational speed and the combustion phase for each cylinder, the difference in characteristics between the cylinders is corrected, and the estimation accuracy of the combustion phase is improved as compared with the case of using the same calibration curve between the cylinders. In a case where only one correlation characteristic (calibration curve) is used in a plurality of cylinders, the control is simplified.

Then, the combustion phase is estimated from the maximum speed timing (local crank angle $\theta_{max}$) of the engine rotational speed by using the calibration curve. As described above, since there are the positive correlation region and the negative correlation region, as illustrated in FIG. 13, the combustion phase estimated from $\theta_{max}$ by using the calibration curve has two values of MFB (1) and MFB (2). Therefore, in order to determine the combustion phase, it is necessary to determine which of the positive correlation region and the negative correlation region of the calibration curve is used.

The combustion-phase-calculation-means selection unit 122c selects which one of the positive correlation region of the calibration curve and the negative correlation region of the calibration curve is to be used, based on the operation state of the engine 1 (may be referred to as an "engine state" below). The combustion phase calculation unit 122d estimates the current combustion phase by using the correlation region of the selected calibration curve, from the maximum speed timing (local crank angle $\theta_{max}$) of the engine rotational speed delivered from the extreme value timing calculation unit 122b. Even in a case where the minimum speed timing of the engine rotational speed is used, the control is performed based on the case using the maximum speed timing.

[Reason Why Positive Correlation Occurs between Maximum Speed Timing and Combustion Phase] Here, the reason why the positive correlation occurs between the maximum speed timing (local crank angle $\theta_{max}$) of the engine rotational speed and the combustion phase in a case where the combustion phase is on the retard side of the vicinity of the compression top dead center will be described below.

The temporal change of the engine rotational speed is expressed by a motion equation of a rotating body, which is represented by Equation (5). Here, $T_C$ is combustion torque, and $T_L$ is load torque. ($T_C-T_L$) is inertial torque. In addition, I is a moment of inertia, and t is time.

[Equation 5]

$$I\frac{d\omega}{dt} = T_C - T_L \quad (5)$$

As is clear from Equation (5), a rotational acceleration $d\omega/dt$ and the combustion torque $T_C$ are in a proportional relationship, and, if the combustion torque $T_C$ changes, the rotational acceleration $d\omega/dt$ changes accordingly. For example, if the combustion phase is retarded, a generation timing of the combustion torque is retarded, and, in synchronization with this, a timing at which the rotational acceleration $d\omega/dt$ becomes the maximum is delayed. Therefore, a positive correlation appears between the maximum timing of the rotational acceleration $d\omega/dt$ and the combustion phase.

On the other hand, in a case where the change in the load torque $T_L$ is small, the temporal change in the combustion torque $T_C$ is substantially sinusoidal. This is because the length of the arm of the crank, which determines the magnitude of the combustion torque, changes sinusoidally with the rotation of the crankshaft. In a case where the rotational acceleration has a sinusoidal shape, the rotational speed obtained by integration of the rotational acceleration also has a sinusoidal shape, and the time-changing waveform of the rotational acceleration and the time-changing waveform of the rotational speed maintain a predetermined phase difference. Therefore, the phase difference between the maximum timing of the rotational acceleration and the maximum timing of the rotational speed is also predetermined, and the combustion phase has a positive correlation with not only the maximum timing of the rotational acceleration but also the maximum timing of the rotational speed.

[Reason Why Negative Correlation Occurs between Maximum Speed Timing and Combustion Phase] Next, the reason why the negative correlation occurs between the maximum speed timing (local crank angle $\theta_{max}$) of the engine rotational speed and the combustion phase in a case where the combustion phase is on the advance side of the vicinity of the compression top dead center will be described with reference to FIGS. 15 and 16.

Figure 15:
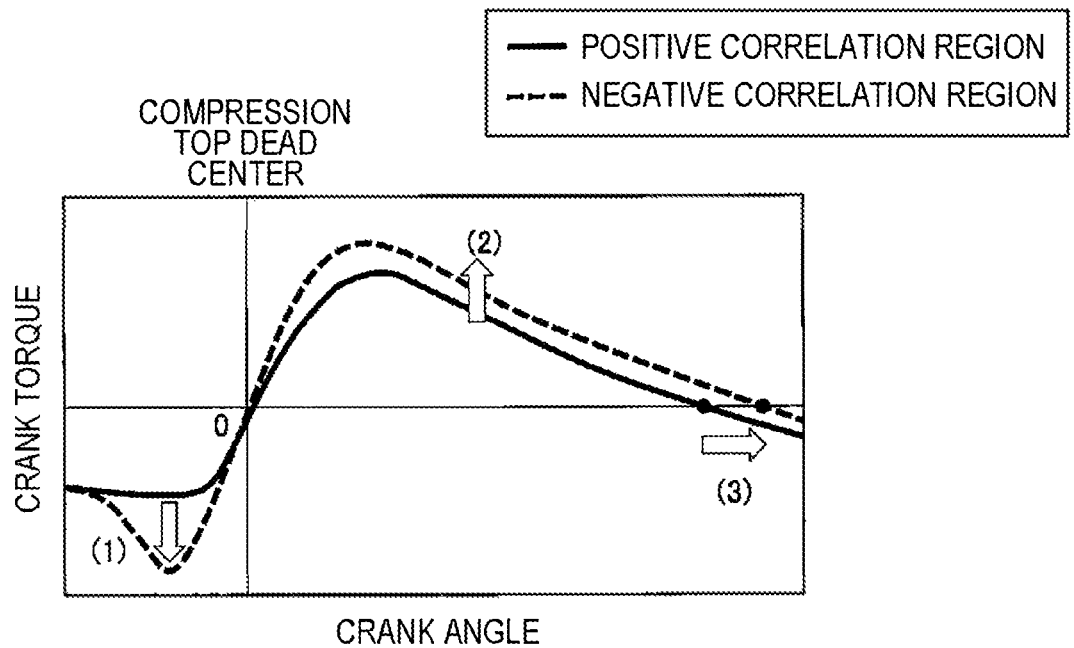
FIG. 15 is a characteristic diagram illustrating a relationship between the crank angle and crank torque.

FIG. 15 illustrates a change in crank torque (combustion torque) before and after the compression top dead center. FIG. 16 illustrates a change in the crank rotational speed (engine rotational speed) corresponding to the crank torque change illustrated in FIG. 15. In FIGS. 15 and 16, a solid line indicates a case where the combustion phase (for example, the crank angle that becomes MFB 50) is in the positive correlation region, and a broken line indicates a case where the combustion phase is in the negative correlation region. If the combustion phase is advanced to the vicinity of the top dead center, the combustion ratio in the compression stroke increases. Thus, negative torque in the compression stroke increases as indicated by a downward arrow ((1) in FIG. 15).

In order to keep the average torque in the entire cycle constant, the controller 12 of the engine 1 performs control to increase the positive torque (arrow portion) so as to compensate for the negative torque ((2) in FIG. 15). More specifically, for example, the engine control unit 122e performs control to increase the suction air amount by increasing the opening of the throttle valve 20 and to increase the fuel injection amount by the fuel injection valve 18. With the increase of the positive torque, the position at which the combustion torque becomes 0 in the expansion stroke moves to the retard side as indicated by an arrow ((3) in FIG. 15).

Figure 16:
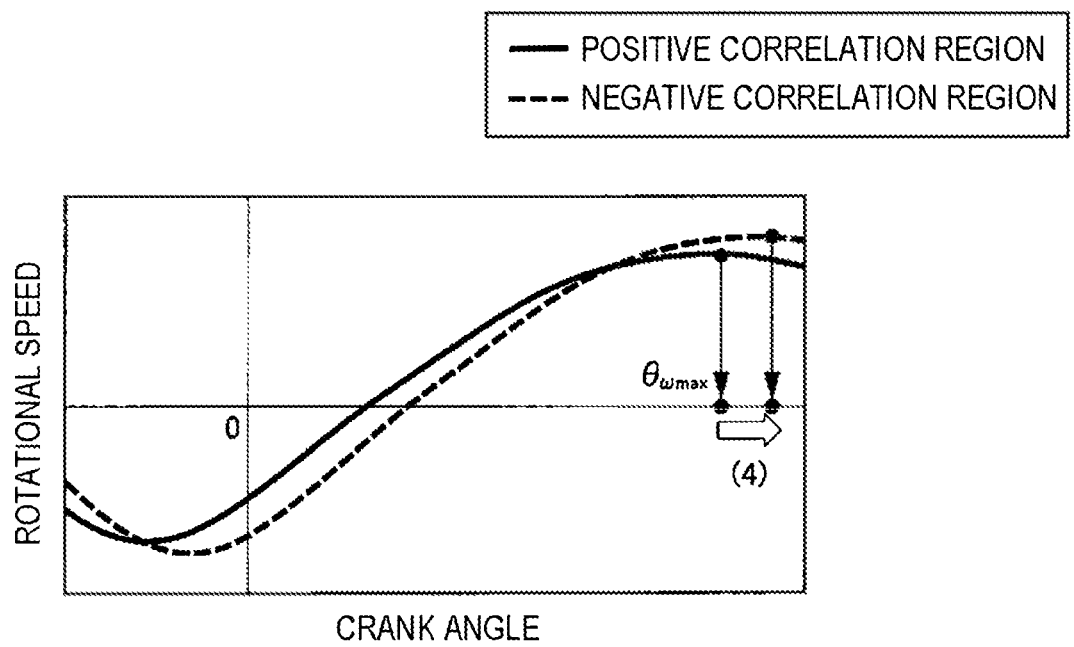
FIG. 16 is a characteristic diagram illustrating a relationship between the crank angle and the rotational speed.

Since the position at which the engine rotational speed becomes the extreme value coincides with the position at which the crank torque becomes 0, the maximum speed timing (local crank angle $\theta_{max}$) of the rotational speed also moves to the retard side as indicated by an arrow ((4) in FIG. 16). That is, in a case where the combustion phase is advanced from the vicinity of the top dead center and large negative torque is generated in the compression stroke, the positive torque increases thereafter and the extreme value timing of the rotational speed moves in a retard direction, and both have a negative correlation.

In the negative correlation region, the thermal efficiency of the engine 1 (internal combustion engine) decreases due to the generation of the large negative torque. Therefore, each actuator of the engine 1 is usually controlled so that the engine 1 operates in the positive correlation region. However, in a transient state such as acceleration or deceleration, there is a probability that an operation point (operation state parameter) of the engine 1 temporarily corresponds to the negative correlation region. In order to appropriately estimate the combustion phase and operate with high thermal efficiency also in this case, it is necessary to determine whether the operation point of the engine 1 is in the positive or negative correlation region and to switch the use range of the calibration curve for obtaining the combustion phase based on the determination result.

[Combustion-phase-calculation-means Selection Unit]

Next, a first selection method in which the combustion-phase-calculation-means selection unit 122*c* of the controller 12 selects the combustion phase calculation means will be described with reference to FIGS. 17 to 25.

(First Example) First, a first example of the first selection method will be described.

Figure 17:
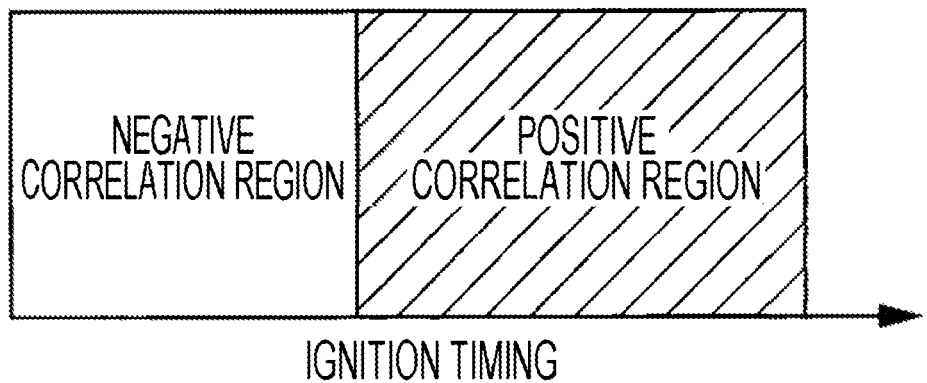
FIG. 17 is a diagram illustrating an example of an engine state estimation map based on an ignition timing according to the first embodiment of the present invention.

FIG. 17 illustrates an example of an engine state estimation map based on the ignition timing of the ignition plug 17. The engine state estimation map (example of a correlation characteristic map) is a map (one-dimensional map information) in which the positive correlation region and the negative correlation region are assigned on the axis of the ignition timing.

If the ignition timing of the ignition plug 17 is delayed, a combustion start timing is delayed, so that the combustion phase is retarded. On the other hand, if the ignition timing is advanced, the combustion start timing is advanced, and the combustion phase is advanced. Therefore, in this map, the positive correlation region is assigned to a region in which the ignition timing is later than a predetermined threshold value, and the negative correlation region is assigned to a region in which the ignition timing is earlier.

This map is created in advance by a combustion experiment, calibration, or the like and stored in the storage unit 123 or the like. The combustion-phase-calculation-means selection unit 122*c* refers to this map during the operation of the engine 1 to determine whether the current operation point (any point on the map) of the engine 1 is in the positive correlation region or the negative correlation region. In a case where it is determined that the current operation point is in the positive correlation region by the map reference, the combustion-phase-calculation-means selection unit 122*c* delivers a command value to the combustion phase calculation unit 122*d* so as to use the positive correlation region of the calibration curve. On the other hand, in a case where it is determined that the current operation point is in the negative correlation region by the map reference, the combustion-phase-calculation-means selection unit 122*c* delivers the command value to the combustion phase calculation unit 122*d* so as to use the negative correlation region of the calibration curve.

A basic engine state estimation map common among the cylinders and an offset value (may also be referred to as a map correction value) from any operation point of the basic engine state estimation map may be stored in the storage unit 123 for each cylinder. The engine state estimation map of each cylinder may be obtained from the basic engine state estimation map and the offset value for each cylinder.

(Second Example) Next, a second example of the first selection method will be described.

Figure 18:
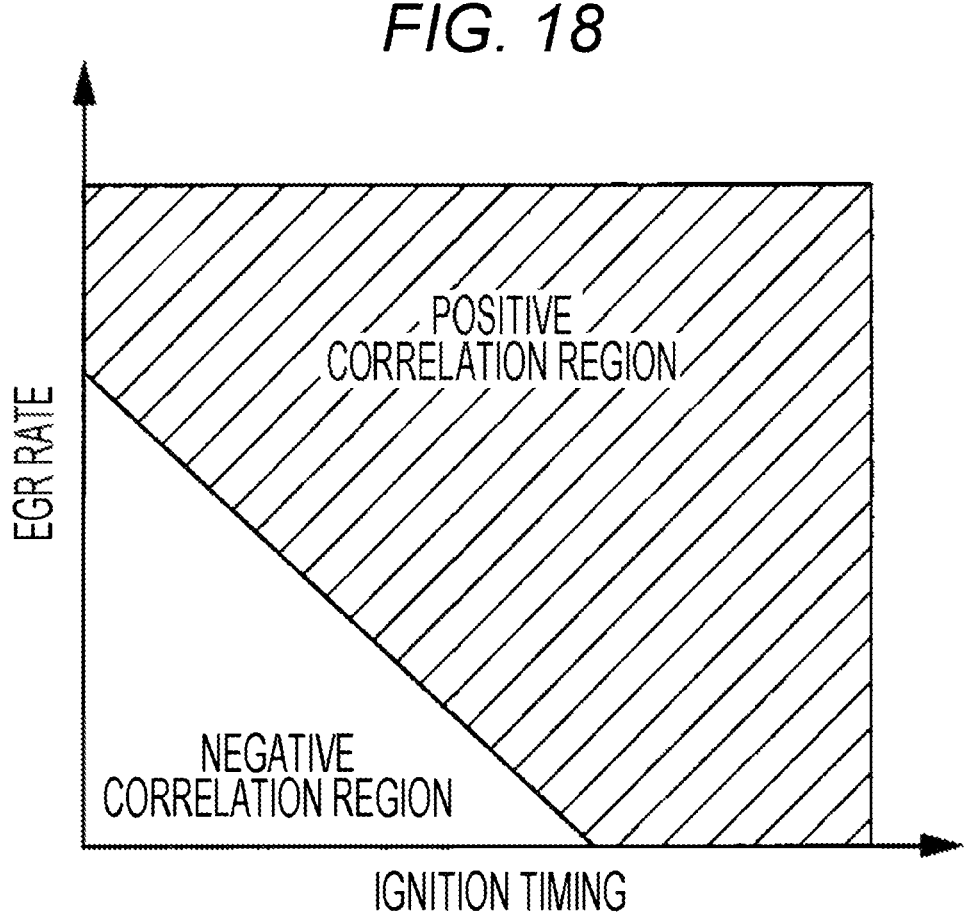
FIG. 18 is a diagram illustrating an example of an engine state estimation map based on the ignition timing and an EGR rate according to the first embodiment of the present invention.

FIG. 18 illustrates an example of the engine state estimation map based on the ignition timing of the ignition plug 17 and an exhaust gas recirculation rate (EGR rate). The engine state estimation map (example of the correlation characteristic map) is a map (two-dimensional map information) in which the positive correlation region and the negative correlation region are assigned on a plane in which one axis is the ignition timing and the other axis is the EGR rate.

If the ignition timing of the ignition plug 17 is delayed or the EGR rate is increased (the oxygen concentration in an air-fuel mixture is reduced), the combustion start timing or the combustion speed is delayed. Thus, the combustion phase is retarded. On the other hand, if the ignition timing is advanced or the EGR rate is decreased (the oxygen concentration in the air-fuel mixture is increased), the combustion start timing or the combustion speed becomes earlier, and the combustion phase is advanced. Therefore, in this map, the positive correlation region is assigned to an obliquely upper right region (upper side of a boundary line) in which the ignition timing is late and the EGR rate is high, and the negative correlation region is assigned to an obliquely lower left region (lower side of the boundary line) in which the ignition timing is early and the EGR rate is low.

The opening of an EGR valve may be used instead of the EGR rate. In general, there is a correlation between the EGR valve opening and the EGR rate, and the EGR rate increases as the EGR valve opening increases.

Figure 19:
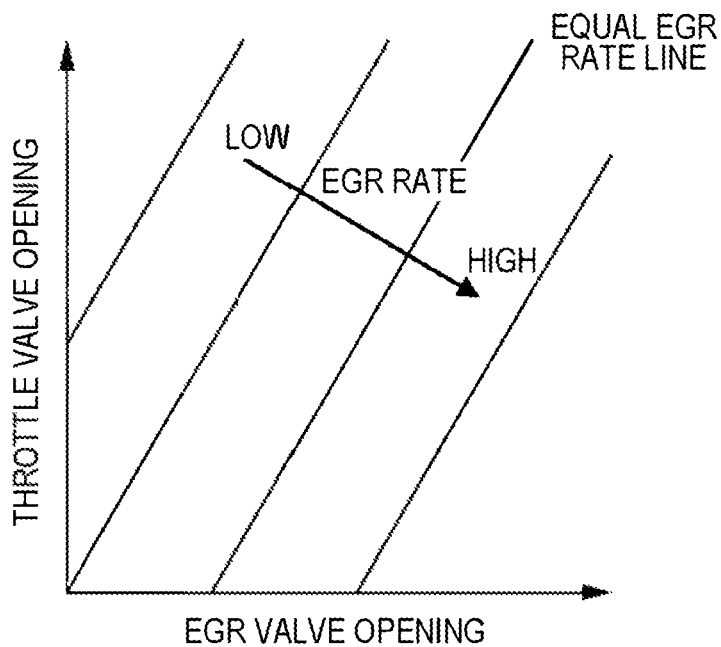
FIG. 19 is a diagram illustrating an example of a map in which the EGR rate with respect to an EGR valve opening and a throttle valve opening is assigned.

Furthermore, the EGR rate changes depending on the throttle valve opening in addition to the EGR valve opening. Therefore, as illustrated in FIG. 19, the EGR rate (a plurality of equal EGR rate lines) with respect to the EGR valve opening and the throttle valve opening may be prepared in advance as a map, and the current EGR rate may be estimated with reference to an EGR rate map from the current EGR valve opening and the throttle valve opening. The EGR rate map is created in advance and stored in a nonvolatile memory such as the storage unit 123. In a case where the operation point designated by the EGR valve opening and the throttle valve opening is located between two equal EGR rate lines, the current EGR rate may be estimated by approximation (interpolation).

The engine state estimation map is created in advance by a combustion experiment, calibration, or the like and stored in the storage unit 123 or the like. The combustion-phase-calculation-means selection unit 122*c* refers to this map during the operation of the engine 1 to determine whether the current operation point (any point on the map) of the engine 1 is in the positive correlation region or the negative correlation region. In a case where it is determined that the current operation point is in the positive correlation region by the map reference, the combustion-phase-calculation-means selection unit 122*c* delivers a command value to the combustion phase calculation unit 122*d* so as to use the positive correlation region of the calibration curve. On the other hand, in a case where it is determined that the current operation point is in the negative correlation region by the map reference, the combustion-phase-calculation-means selection unit 122*c* delivers the command value to the combustion phase calculation unit 122*d* so as to use the negative correlation region of the calibration curve.

A basic engine state estimation map common among the cylinders and an offset value (may also be referred to as a map correction value) from any operation point of the basic engine state estimation map may be stored in the storage unit 123 for each cylinder. The engine state estimation map of each cylinder may be obtained from the basic engine state estimation map and the offset value for each cylinder.

(Third Example) Next, a third example of the first selection method will be described.

Figure 20:
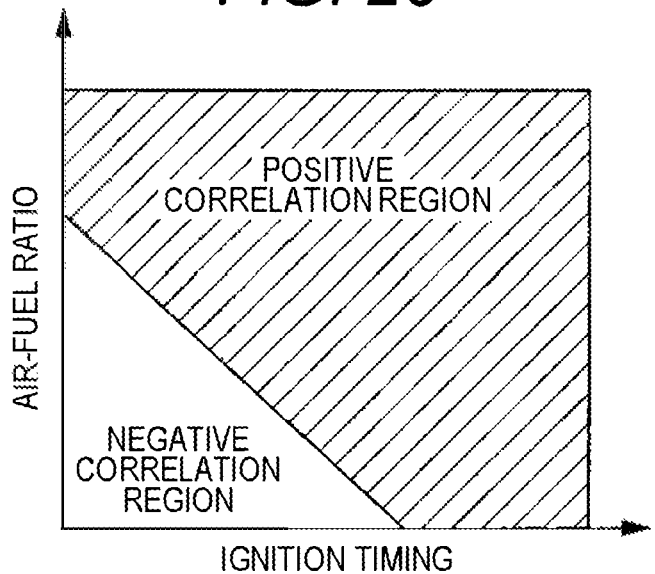
FIG. 20 is a diagram illustrating an example of an engine state estimation map based on the ignition timing and an air-fuel ratio according to the first embodiment of the present invention.

As illustrated in FIG. 20, the engine state estimation map may be a map in which the positive correlation region and the negative correlation region are assigned on a plane in which one axis is the ignition timing and the other axis is the air-fuel ratio. The air-fuel ratio of the exhaust gas is obtained by the output signal of the air-fuel ratio sensor 27. Since the combustion speed decreases as the air-fuel ratio increases, the combustion phase is retarded similar to the case where the EGR rate increases.

(Fourth Example) Furthermore, a fourth example of the first selection method will be described.

Figure 21:
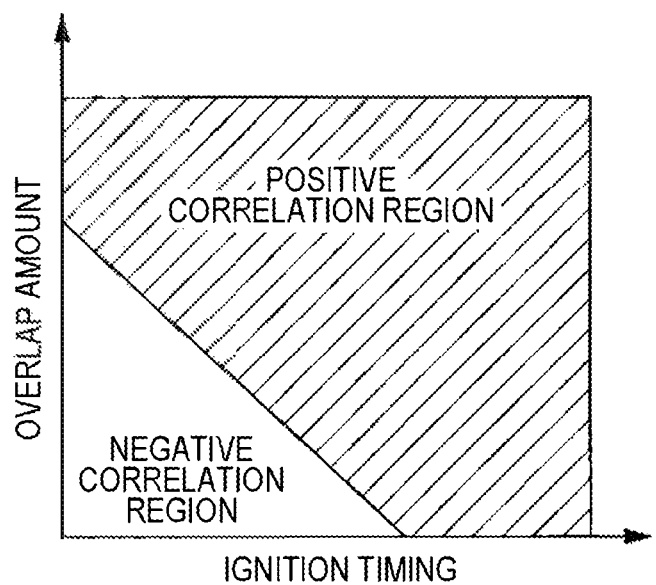
FIG. 21 is a diagram illustrating an example of an engine state estimation map based on the ignition timing and a valve overlap amount according to the first embodiment of the present invention.
Figure 22:
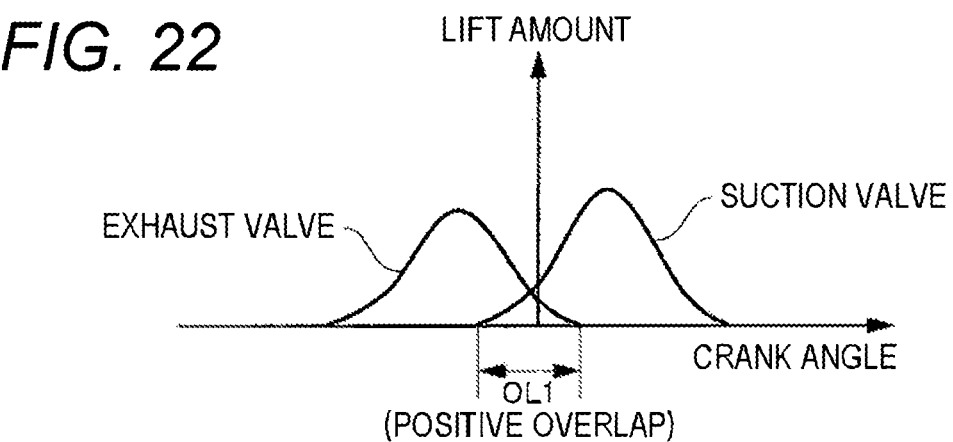
FIG. 22 is an explanatory diagram illustrating a definition of the overlap amount at a time of positive overlap.
Figure 23:
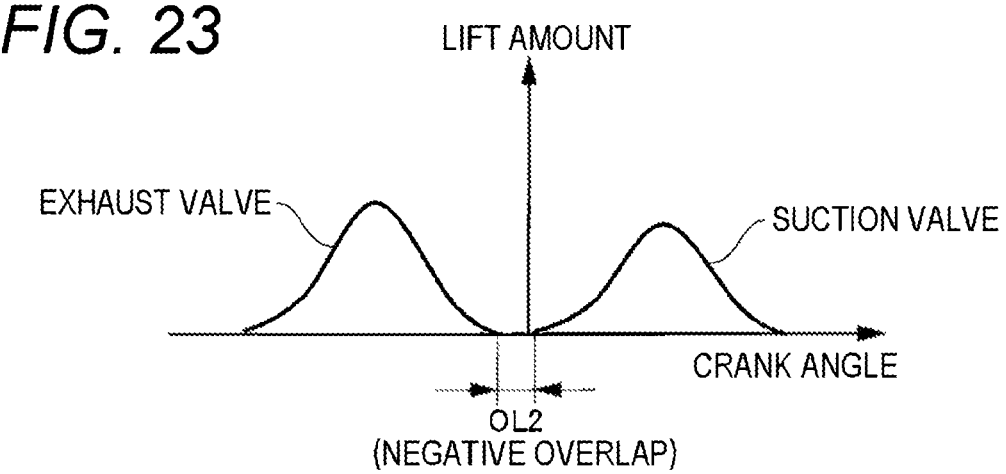
FIG. 23 is an explanatory diagram illustrating a definition of the overlap amount at a time of negative overlap.

As illustrated in FIG. 21, the engine state estimation map may be a map in which the positive correlation region and the negative correlation region are assigned on a plane in which one axis is the ignition timing and the other axis is a valve overlap amount. FIGS. 22 and 23 illustrate the definition of the valve overlap. In FIGS. 22 and 23, the horizontal axis represents the crank angle, and the vertical axis represents the lift amounts of the suction valve and the exhaust valve.

FIG. 22 illustrates a case of so-called a positive overlap in which the suction valve and the exhaust valve are simultaneously opened in the vicinity of the exhaust top dead center. In the case of the positive overlap, a period in which the suction valve and the exhaust valve are simultaneously opened is defined as an overlap period. In the case of the positive overlap, since an EGR gas flowing into the cylinder increases, the EGR rate increases.

FIG. 23 illustrates a case of so-called a negative overlap in which the suction valve and the exhaust valve are simultaneously closed in the vicinity of the exhaust top dead center. In the case of the negative overlap, a period in which the suction valve and the exhaust valve are simultaneously closed is defined as an overlap period. In the case of the negative overlap, since the gas (residual gas) after combustion does not decrease in the cylinder, the EGR rate increases.

In both the case of the positive overlap and the case of the negative overlap, if the valve overlap amount increases, the EGR rate in the cylinder of the internal combustion engine increases. Therefore, in the engine state estimation map in FIG. 21, the positive correlation region is assigned to a side on which the ignition timing is late and the valve overlap amount is large, and the negative correlation region is assigned to a side on which the ignition timing is early and the valve overlap amount is small.

The valve overlap amount is adjusted by a variable valve mechanism capable of changing the phase angle of the suction valve and/or the exhaust valve by hydraulic pressure, electric power, or the like.

Figure 24:
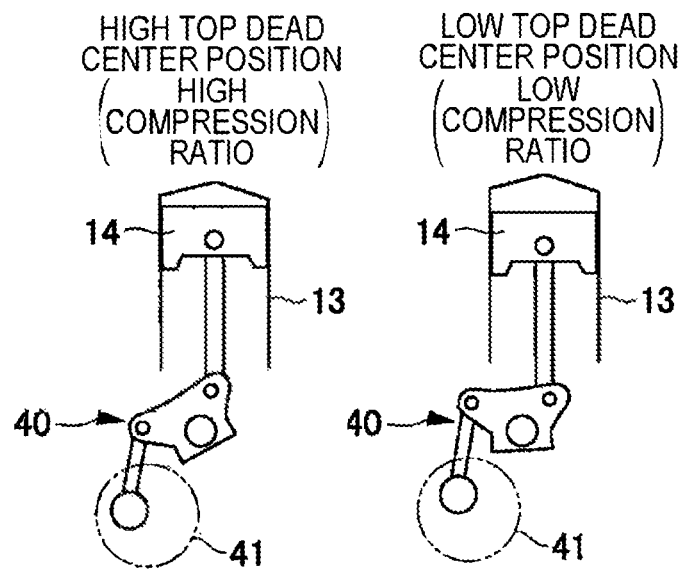
FIG. 24 is an explanatory view illustrating a change in a piston top dead center position by a variable compression ratio mechanism.

(Fifth Example) A variable compression ratio engine capable of changing a compression ratio during the operation of the internal combustion engine is known. In the variable compression ratio engine, as illustrated in FIG. 24, for example, the top dead center position of the piston 14 can be changed up and down even during the operation by a variable compression ratio mechanism 40 using an eccentric cam 41. By adjusting the rotational position of the eccentric cam 41 to set the top dead center position of the piston 14 to be high, the combustion chamber volume (gap volume) of the cylinder 13 at the piston top dead center decreases, and the compression ratio increases. In addition, by setting the top dead center position of the piston 14 to be low, the volume (gap volume) of the combustion chamber of the cylinder 13 at the top dead center of the piston increases, and the compression ratio decreases.

Figure 25:
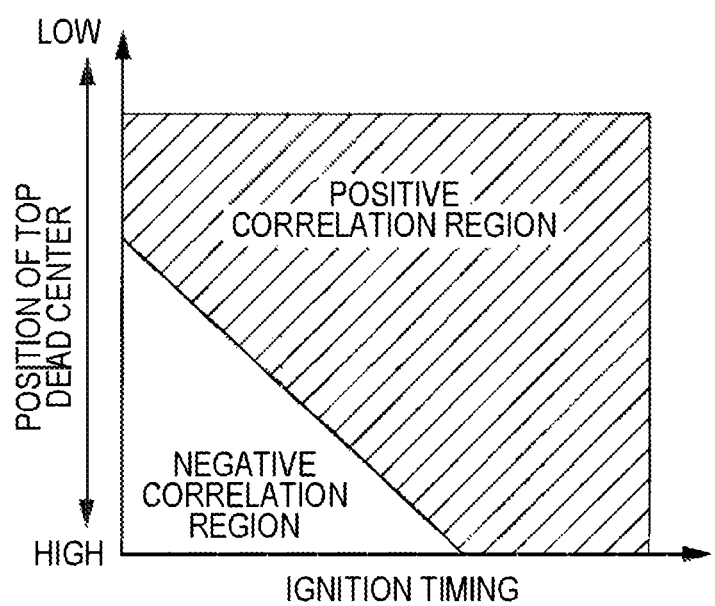
FIG. 25 is a diagram illustrating an example of an engine state estimation map based on the ignition timing and a top dead center position according to the first embodiment of the present invention.

In such a variable compression ratio engine, as illustrated in FIG. 25, the engine state estimation map may be a map in which the positive correlation region and the negative correlation region are assigned on a plane in which one axis is the ignition timing and the other axis is the top dead center position of the piston 14. If the top dead center position of the piston 14 is lowered, the unburned gas temperature in the vicinity of the ignition timing is lowered. Thus, the combustion speed is reduced. In addition, if the top dead center position of the piston 14 is lowered, the EGR rate increases due to an increase in the amount of residual gas in the cylinder. Thus, the combustion phase is retarded and becomes in the positive correlation region.

If the top dead center position of the piston 14 is increased, the unburned gas temperature in the vicinity of the ignition timing increases. Thus, the combustion speed increases. In addition, if the top dead center position of the piston 14 is increased, the EGR rate is lowered due to a decrease in the amount of residual gas in the cylinder. Thus, the combustion phase is advanced and becomes in the negative correlation region.

Furthermore, the engine state estimation map may be a map in which the positive correlation region and the negative correlation region are assigned to a multidimensional space based on the ignition timing and any two or more of the EGR rate (EGR valve opening), the valve overlap amount, and the top dead center position of the piston. That is, the engine state estimation map can be set to a map in which the positive correlation region and the negative correlation region are assigned to a space including three-dimensional or more information including at least the ignition timing. In addition to the above parameters, the positive or negative correlation region may be determined using the engine state estimation map in which parameters that have an influence on the phase of combustion, such as the temperature, the humidity, the rotational speed of the internal combustion engine, a load (torque), a fuel injection timing, and fuel properties (for example, pressure, concentration, viscosity), are used as reference axes.

As described above, the internal combustion engine control device (controller 12) according to the first embodiment includes the rotational speed calculation unit (rotational speed calculation unit 122a) that calculates the crank rotational speed ($\omega$) of the internal combustion engine (engine 1), the extreme value timing calculation unit (extreme value timing calculation unit 122b) that calculates the extreme value timing ($\theta_{max}$) at which the crank rotational speed calculated by the rotational speed calculation unit becomes the extreme value, the combustion-state-calculation-means selection unit (combustion-phase-calculation-means selection unit 122c) that selects the combustion state calculation means (calibration curves f1 and f2) for calculating the combustion state (for example, the combustion phase of MFB 50) in the combustion chamber based on the operation state (operation state parameter) of the internal combustion engine, and the combustion state estimation unit (combustion phase calculation unit 122d) that estimates the combustion state in the combustion chamber from the extreme value timing of the crank rotational speed by using the combustion state calculation means selected by the combustion-state-calculation-means selection unit.

In addition, the internal combustion engine control device (controller 12) according to the present embodiment includes the engine control unit (engine control unit 122e) that controls the internal combustion engine based on the combustion state in the combustion chamber, which is estimated by the combustion state estimation unit (combustion phase calculation unit 122d).

According to the present embodiment having the above configuration, even in a case where the combustion state in the combustion chamber greatly changes (for example, in a case where the combustion phase is greatly advanced or retarded), it is possible to accurately estimate the combustion state in the combustion chamber by using the combustion state calculation means selected based on the operation state of the internal combustion engine among the plurality of pieces of combustion state calculation means.

Since the estimation accuracy of the combustion state in the combustion chamber is improved, it is possible to control the internal combustion engine based on the estimation result of the combustion state even in a case where the combustion state in the combustion chamber greatly changes.

In the internal combustion engine control device (controller 12) according to the present embodiment, the combustion-state-calculation-means selection unit (combustion-phase-calculation-means selection unit 122*c*) is configured to select the combustion state calculation means (calibration curves f1 and f2) by using the operation state estimation map in which one or more parameters representing the operation state of the internal combustion engine (engine 1) are assigned.

Specifically, in the internal combustion engine control device (controller 12) according to the present embodiment, the operation state estimation map is a map (see FIG. 17) referred from at least the ignition timing.

In addition, in the internal combustion engine control device (controller 12) according to the present embodiment, the operation state estimation map is a map (see FIG. 18) referred to from at least the ignition timing and the EGR rate, or the ignition timing and the EGR valve opening.

In addition, in the internal combustion engine control device (controller 12) according to the present embodiment, the operation state estimation map is a map (see FIG. 20) referred to at least from the ignition timing and the air-fuel ratio of the suction air.

In addition, in the internal combustion engine control device (controller 12) according to the present embodiment, the operation state estimation map is a map (see FIG. 21) referred to from at least the ignition timing and the valve overlap amounts of the suction valve and the exhaust valve (at the time of the positive overlap or the negative overlap).

In the internal combustion engine control device (controller 12) according to the present embodiment, the operation state estimation map is a map (see FIG. 25) referred to at least from the ignition timing and the height of the piston top dead center.

Figure 26:
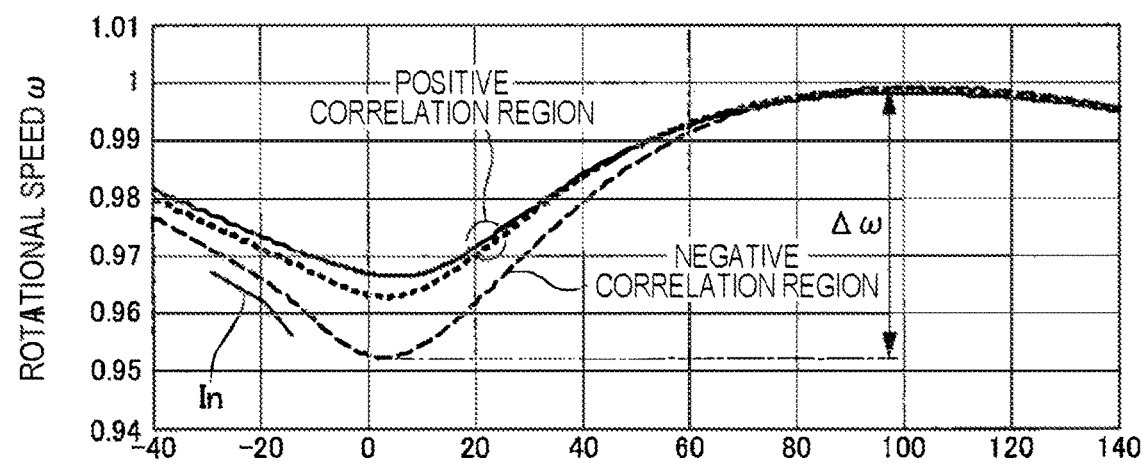
FIG. 26 is a characteristic diagram illustrating a relationship between the crank angle and the rotational speed and a relationship between the crank angle and a rotational speed differential value before and after a compression top dead center.
Figure 26:
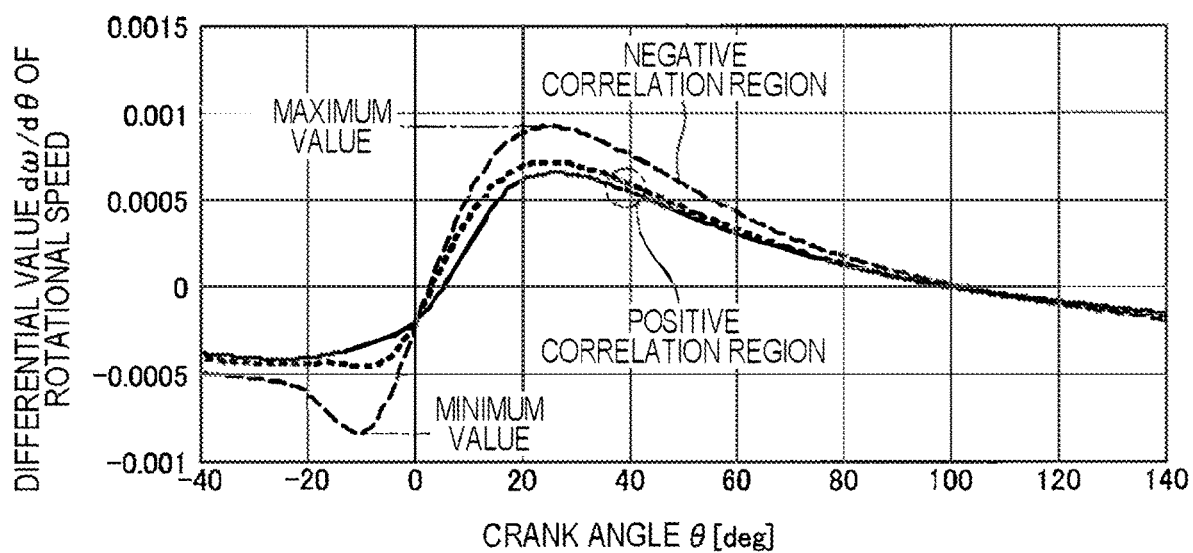

<Second Embodiment> Next, a second selection method in which the combustion-phase-calculation-means selection unit 122*c* of the controller 12 selects the combustion phase calculation means will be described with reference to FIGS. 26 to 29 as a second embodiment of the present invention.
(First Example) The upper side of FIG. 26 illustrates a difference in the crank rotational speed $\omega$ before and after the compression top dead center ($\theta = 0°$) and the differential value $d\omega/d\theta$ between a case where the combustion phase is in the positive correlation region and a case where the combustion phase is in the negative correlation region. The lower side of FIG. 26 illustrates the differential value $d\omega/d\theta$ of the rotational speed $\omega$ illustrated on the upper side of FIG. 26. On the upper side and the lower side of FIG. 26, a solid line and a short broken line represent positive correlation regions, and a long broken line represents a positive correlation region.

As illustrated in the upper side of FIG. 26, in the negative correlation region, the rotational speed $\omega$ is largely reduced in the vicinity of the compression top dead center due to the generation of the negative torque in the compression stroke (before 0°). Therefore, in the negative correlation region, the difference $\Delta\omega$ (fluctuation range) between the maximum value of the rotational speed $\omega$ in the expansion stroke (after 0°) and the minimum value of the rotational speed $\omega$ in the vicinity of the compression top dead center is larger than $\Delta\omega$ in the positive correlation region.

Figure 27:
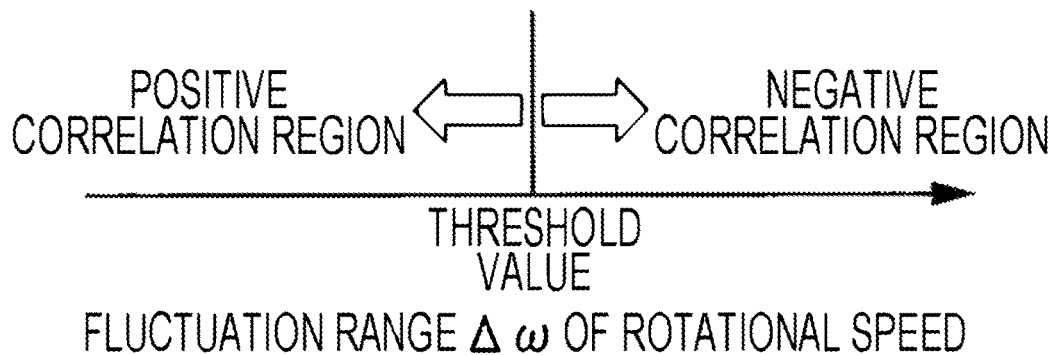
FIG. 27 is an explanatory diagram illustrating a method of determining a correlation region based on a fluctuation range of a rotational speed according to a second embodiment of the present invention.

Thus, the combustion-phase-calculation-means selection unit 122*c* calculates the fluctuation range $\Delta\omega$ of the rotational speed $\omega$, and compares the fluctuation range $\Delta\omega$ to a predetermined threshold value. As illustrated in FIG. 27, the combustion-phase-calculation-means selection unit 122*c* can determine that the combustion phase is in the positive correlation region, in a case where the fluctuation range $\Delta\omega$ of the rotational speed $\omega$ is smaller than the threshold value. The combustion-phase-calculation-means selection unit 122*c* can determine that the combustion phase is in the negative correlation region, in a case where the fluctuation range $\Delta\omega$ of the rotational speed $\omega$ is equal to or more than the threshold value.

(Second Example) In addition, as illustrated on the lower side of FIG. 26, in the negative correlation region, the maximum value of the differential value $d\omega/d\theta$ of the rotational speed $\omega$ becomes more than the maximum value of the differential value $d\omega/d\theta$ of the rotational speed $\omega$ in the positive correlation region due to the increase in the fluctuation range $\Delta\omega$ of the rotational speed $\omega$.

Furthermore, as illustrated on the upper side of FIG. 26, in the negative correlation region, the inflection In occurs in the rotational speed change in the vicinity of the compression top dead center due to the generation of the negative torque in the compression stroke. Therefore, as illustrated on the lower side of FIG. 26, in the negative correlation region, the absolute value of the minimum value of the differential value $d\omega/d\theta$ of the rotational speed $\omega$ in the vicinity of the compression top dead center is more than the absolute value of the minimum value of the differential value $d\omega/d\theta$ in the positive correlation region.

Figure 28:
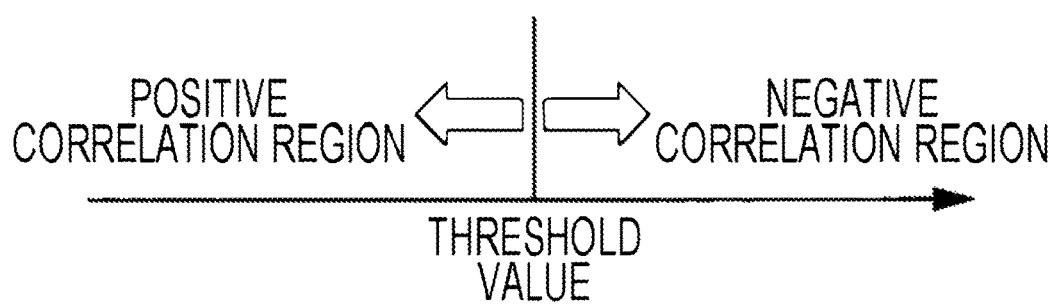
FIG. 28 is an explanatory diagram illustrating a method of determining the correlation region based on a maximum value of rotational speed differentiation according to the second embodiment of the present invention.

Thus, the combustion-phase-calculation-means selection unit 122*c* calculates the maximum value of the differential value $d\omega/d\theta$ of the rotational speed $\omega$, and compares the maximum value of the differential value $d\omega/d\theta$ to a predetermined threshold value. As illustrated in FIG. 28, the combustion-phase-calculation-means selection unit 122*c* can determine that the combustion phase is in the positive correlation region, in a case where the maximum value of the differential value $d\omega/d\theta$ of the rotational speed $\omega$ is smaller than the threshold value. The combustion-phase-calculation-means selection unit 122*c* can determine that the combustion phase is in the negative correlation region, in a case where the maximum value of the differential value $d\omega/d\theta$ of the rotational speed $\omega$ is equal to or more than the threshold value ((1) in the second example).

Figure 29:
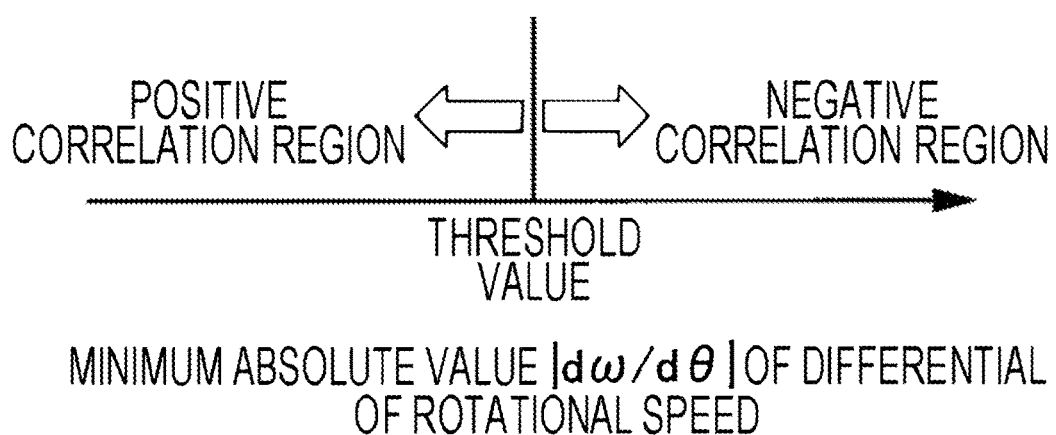
FIG. 29 is an explanatory diagram illustrating a method of determining the correlation region based on a minimum absolute value of the rotational speed differentiation according to the second embodiment of the present invention.

In addition, the combustion-phase-calculation-means selection unit 122*c* calculates the absolute value $|d\omega/d\theta|$ of the minimum value of the differential value $d\omega/d\theta$ of the rotational speed $\omega$, and compares the absolute value $|d\omega/d\theta|$ of the minimum value of the differential value $d\omega/d\theta$ to a predetermined threshold value. As illustrated in FIG. 29, in a case where the absolute value $|d\omega/d\theta|$ of the minimum value of the differential value $d\omega/d\theta$ of the rotational speed $\omega$ is smaller than the threshold value, the combustion-phase-calculation-means selection unit 122*c* can determine that the combustion phase is in the positive correlation region. In addition, in a case where the absolute value $|d\omega/d\theta|$ of the minimum value of the differential value $d\omega/d\theta$ of the rotational speed $\omega$ is equal to or more than the threshold value, the combustion-phase-calculation-means selection unit 122*c* can determine that the combustion phase is in the negative correlation region ((2) in the second example).

The threshold values are changed in accordance with the operation state of the internal combustion engine, so that it is possible to more accurately determine the positive correlation region and the negative correlation region. For example, in a case where the internal combustion engine is operated under a condition of high torque, a low rotational speed, a high compression ratio, or a high temperature, the fluctuation of the rotational speed ω in the cycle increases. Therefore, it is desirable to further increase the threshold value for the fluctuation range Δω of the rotational speed ω or the threshold value for the absolute value of the minimum value or the maximum value of the differential value dω/dθ of the rotational speed ω, as the torque becomes higher, the rotational speed becomes lower, the compression ratio becomes higher, or the air temperature becomes higher. An appropriate threshold value under the conditions may be obtained in advance by a combustion experiment, calibration, or the like and stored in the storage unit 123 or the like.

As described above, in the internal combustion engine control device (controller 12) according to the second embodiment, the combustion-state-calculation-means selection unit (combustion-phase-calculation-means selection unit 122c) is configured to select the combustion state calculation means (calibration curves f1 and f2) based on the magnitude of the fluctuation range (Δω) of the crank rotational speed (ω) before and after the compression top dead center.

In addition, in the internal combustion engine control device (controller 12) according to the present embodiment, the combustion-state-calculation-means selection unit (combustion-phase-calculation-means selection unit 122c) is configured to select the combustion state calculation means (calibration curves f1 and f2) based on the magnitude (|dω/dθ|) of the minimum value or the maximum value of the differential value of the crank rotational speed (ω) within a predetermined range from the compression top dead center.

<Third Embodiment> Next, a third selection method in which the combustion-phase-calculation-means selection unit 122c of the controller 12 selects the combustion phase calculation means will be described with reference to FIGS. 30 to 34 as a third embodiment of the present invention.

Figure 30:
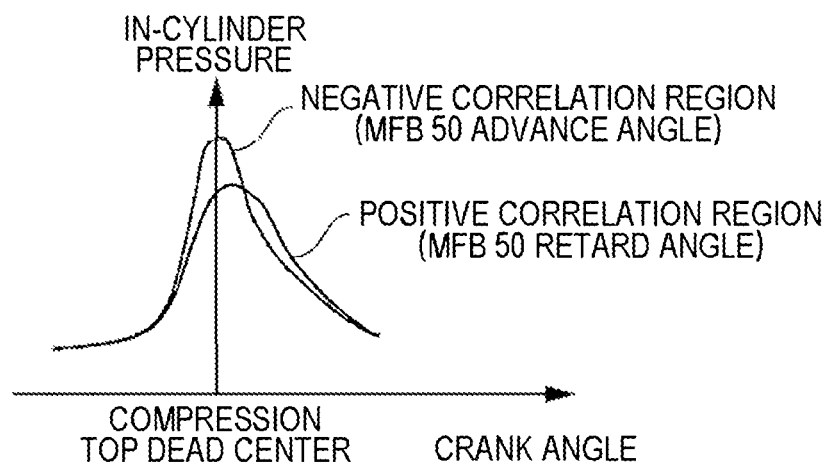
FIG. 30 is a characteristic diagram illustrating a relationship between the crank angle and pressure in the cylinder before and after the compression top dead center.

(First example) FIG. 30 illustrates a difference in pressure in the cylinder before and after the compression top dead center (θ=0°) between the case where the combustion phase is in the positive correlation region and the case where the combustion phase is in the negative correlation region. FIG. 30 illustrates an example of the pressure characteristic in the cylinder when the mass fraction burned (MFB) is 50%. The pressure in the cylinder is obtained by an output signal of a pressure sensor (not illustrated) provided in the cylinder.

In the negative correlation region (broken line), the combustion phase (position of the MFB 50) is advanced. Thus, the maximum value of the in-cylinder pressure in the vicinity of the compression top dead center becomes higher than the maximum value of the in-cylinder pressure in the positive correlation region (solid line) due to the combustion heat generated in the compression stroke (before 0°). Thus, the combustion-phase-calculation-means selection unit 122c can determine the positive correlation region and the negative correlation region from the maximum value of the in-cylinder pressure. For example, a threshold value is set in advance, and, in a case where the maximum value of the in-cylinder pressure is smaller than the threshold value, the combustion-phase-calculation-means selection unit 122c can determine that the combustion phase is in the positive correlation region. In a case where the maximum value of the in-cylinder pressure is equal to or more than the threshold value, the combustion-phase-calculation-means selection unit 122c can determine that the combustion phase is in the negative correlation region.

Figure 31:
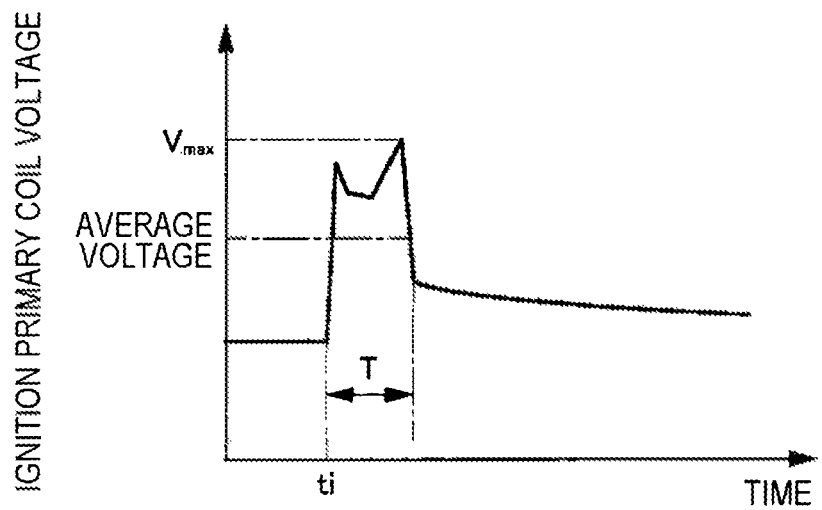
FIG. 31 is a characteristic diagram illustrating a temporal change of an ignition primary coil voltage.

(Second Example) FIG. 31 illustrates an example of a temporal change of an ignition primary coil voltage in the vicinity of the ignition timing. The engine 1 includes a primary coil to which a primary current is applied from a battery based on a control signal of the controller 12, and a secondary coil connected to an electrode of the ignition plug 17. If a magnetic flux change occurs in the primary coil, a primary voltage (ignition primary coil voltage) is generated by self-induction, and a high secondary voltage corresponding to a winding number ratio is generated in the secondary coil by mutual induction. The secondary voltage is applied to the electrode of the ignition plug 17, and spark discharge occurs at the electrode.

The ignition primary coil voltage rapidly increases from a predetermined voltage value at the ignition timing ti (ignition timing), rapidly decreases after reaching the maximum value Vmax, and then gradually approaches the predetermined voltage value at the ignition timing ti. An ignition discharge period T is a period in which the voltage of the ignition primary coil rises after the ignition timing ti and decreases to a predetermined voltage value. In addition, the voltage of the ignition primary coil is represented by the maximum value Vmax of the ignition primary coil voltage or the average value of the ignition primary coil voltage in the ignition discharge period T.

The ignition discharge period T of the ignition plug 17 depends on the in-cylinder pressure, and the higher the in-cylinder pressure during discharge, the shorter the ignition discharge period. In addition, the ignition primary coil voltage for causing the ignition plug 17 to perform spark discharge depends on the in-cylinder pressure, and the higher the in-cylinder pressure during discharge, the higher the voltage of the ignition primary coil.

Figure 32:
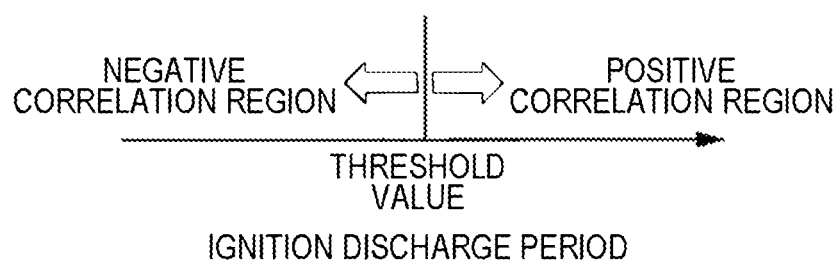
FIG. 32 is an explanatory diagram illustrating a method of determining a correlation region based on an ignition discharge period according to a third embodiment of the present invention.

Therefore, as illustrated in FIG. 32, the combustion-phase-calculation-means selection unit 122c can determine that the combustion phase is in the negative correlation region, in a case where the ignition discharge period T is shorter than a predetermined threshold value, and can determine that the combustion phase is in the positive correlation region, in a case where the ignition discharge period T is equal to or longer than the predetermined threshold value.

Figure 33:
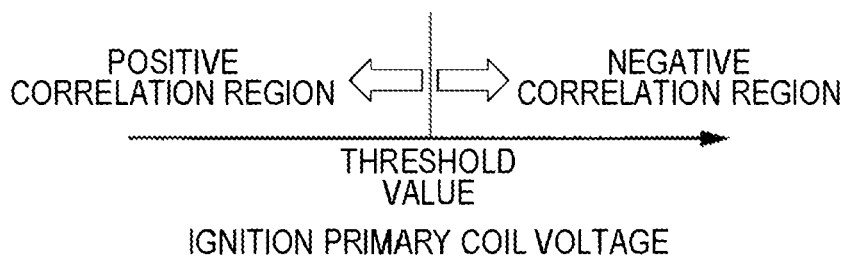
FIG. 33 is an explanatory diagram illustrating a method of determining the correlation region based on an ignition primary coil voltage according to the third embodiment of the present invention.

(Third Example) In addition, as illustrated in FIG. 33, the combustion-phase-calculation-means selection unit 122c can determine that the combustion phase is in the positive correlation region, in a case where the voltage of the ignition primary coil is lower than a predetermined threshold value, and can determine that the combustion phase is in the negative correlation region, in a case where the voltage of the ignition primary coil is equal to or higher than the predetermined threshold value.

Figure 34:
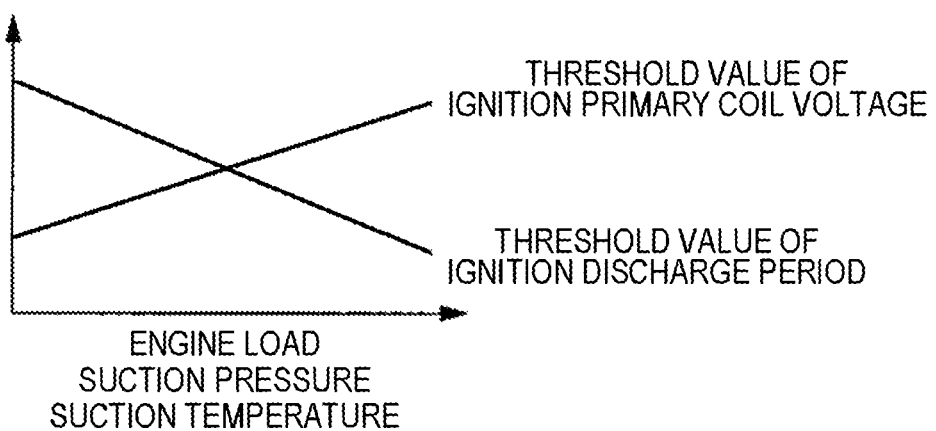
FIG. 34 is an explanatory diagram illustrating an example in which threshold values of the ignition primary coil voltage and the ignition discharge period are set in accordance with an operation state of an internal combustion engine according to the third embodiment of the present invention.

By changing the threshold values for the ignition discharge period T and the voltage of the ignition primary coil in accordance with the operation state of the engine 1, it is possible to more accurately determine the positive correlation region and the negative correlation region. For example, if the engine load (torque), the suction air pressure, or the suction air temperature increases, the maximum value of the in-cylinder pressure further increases. Therefore, as illustrated in FIG. 34, it is desirable to change the threshold value for the ignition discharge period T and the threshold value for the ignition primary coil voltage in accordance with the engine load (torque), the suction air pressure, or the suction air temperature. For example, as the engine load (torque), the suction air pressure, or the suction air temperature becomes higher, the threshold value of the ignition discharge period is decreased, and the threshold value of the voltage of the ignition primary coil is increased. The suction air pressure and the suction air temperature are obtained from output signals of a pressure sensor and a temperature sensor (not illustrated) provided at the suction port 21.

As described above, in the internal combustion engine control device (controller 12) according to the third embodiment, the combustion-state-calculation-means selection unit (combustion-phase-calculation-means selection unit 122c) is configured to select the combustion state calculation means (calibration curves f1 and f2) based on the maximum value of the pressure in the cylinder.

In the internal combustion engine control device (controller 12) according to the present embodiment, the combustion-state-calculation-means selection unit (combustion-phase-calculation-means selection unit 122c) is configured to select the combustion state calculation means (calibration curves f1 and f2) based on the length of the ignition discharge period.

In the internal combustion engine control device (controller 12) according to the present embodiment, the combustion-state-calculation-means selection unit (combustion-phase-calculation-means selection unit 122c) is configured to select the combustion state calculation means (calibration curves f1 and f2) based on the magnitude of the ignition coil voltage.

<Advantageous Effects of Invention> According to the first to third embodiments of the present invention, it is possible to accurately estimate the combustion state (combustion phase) by using the information of the crank rotational speed over a wide operation range (for example, several cycles) of the internal combustion engine. As a result, even in the transient operation state in which the load (torque) and the rotational speed of the internal combustion engine change within a short period, it is possible to control the internal combustion engine based on the estimated combustion phase. For example, the engine control unit 122e controls the ignition timing, the fuel injection timing, the opening/closing timing of the suction valve and/or the exhaust valve by the variable valve mechanism, the compression ratio by the variable compression ratio mechanism, the throttle valve opening, the EGR valve opening, a wastegate valve opening of a supercharger (not illustrated), and the like so that the combustion phase becomes an appropriate value.

In addition, in a generator engine mounted on a hybrid vehicle, a field current or the like of a generator is also controlled by the engine control unit 122e, for example, so that the combustion phase becomes an appropriate value. As a result, it is possible to improve fuel efficiency during the transient operation and to reduce emission amounts of soot, unburned hydrocarbon, NOx, CO, and the like.

<Others> Furthermore, it should be noted that the present invention is not limited to the above-described embodiments, and it goes without saying that various other application examples and modification examples can be taken as long as the gist of the present invention described in the claims is not deviated.

For example, each of the above-described embodiments describe the configurations of the controller 12 in detail and concretely in order to explain the present invention in an easy-to-understand manner, and are not necessarily limited to those including all the described components. In addition, a portion of the configuration of one embodiment can be replaced with a component of another embodiment. Further, the configuration of one embodiment can be added to the configuration of another embodiment. Regarding a portion of the configuration in the embodiments, other components can also be added, replaced, and deleted.

Some or all of the configurations, functions, processing units, and the like may be realized in hardware by being designed with an integrated circuit, for example. A field programmable gate array (FPGA), an application specific integrated circuit (ASIC), and the like may be used as the hardware.

REFERENCE SIGNS LIST 1 engine
10 knock sensor
11 crank angle sensor
12 controller
17 ignition plug
20 throttle valve
26 timing rotor
28 EGR pipe
29 EGR valve
30 crank shaft
121 input/output unit
122 control unit
122a rotational speed calculation unit
122b extreme value timing calculation unit
122c combustion-phase-calculation-means selection unit
122d combustion phase calculation unit
122e engine control unit
123 storage unit
f1, f2 calibration curve

The invention claimed is:

1. An internal combustion engine control device comprising:
   a rotational speed calculation unit that calculates a crank rotational speed of an internal combustion engine;
   an extreme value timing calculation unit that calculates an extreme value timing at which the crank rotational speed calculated by the rotational speed calculation unit becomes an extreme value;
   a combustion-state-calculation-means selection unit that selects combustion state calculation means for calculating a combustion state in a combustion chamber based on an operation state of the internal combustion engine; and
   a combustion state estimation unit that estimates the combustion state in the combustion chamber from the extreme value timing of the crank rotational speed by using the combustion state calculation means selected by the combustion-state-calculation-means selection unit.

2. The internal combustion engine control device according to claim 1, wherein the combustion-state-calculation-means selection unit selects the combustion state calculation means by using an operation state estimation map in which one or more parameters representing the operation state of the internal combustion engine are assigned.

3. The internal combustion engine control device according to claim 2, wherein the operation state estimation map is a map using, as a reference, at least an ignition timing.

4. The internal combustion engine control device according to claim 2, wherein the operation state estimation map is a map using, as a reference, at least an ignition timing and an EGR rate, or an ignition timing and an EGR valve opening.

5. The internal combustion engine control device according to claim 2, wherein the operation state estimation map is a map using, as a reference, at least an ignition timing and an air-fuel ratio in suction.

6. The internal combustion engine control device according to claim 2, wherein the operation state estimation map is a map using, a reference, at least an ignition timing and valve overlap amounts of a suction valve and an exhaust valve.

7. The internal combustion engine control device according to claim 2, wherein the operation state estimation map is a map using, a reference, at least an ignition timing and a height of a piston top dead center.

8. The internal combustion engine control device according to claim 1, wherein the combustion-state-calculation-means selection unit selects the combustion state calculation means based on a magnitude of a fluctuation range of the crank rotational speed before and after a compression top dead center.

9. The internal combustion engine control device according to claim 1, wherein the combustion-state-calculation-means selection unit selects the combustion state calculation means based on a magnitude of a minimum value or a maximum value of a differential value of the crank rotational speed within a predetermined range from a compression top dead center.

10. The internal combustion engine control device according to claim 1, wherein the combustion-state-calculation-means selection unit selects the combustion state calculation means based on a maximum value of pressure in a cylinder.

11. The internal combustion engine control device according to claim 1, wherein the combustion-state-calculation-means selection unit selects the combustion state calculation means based on a length of an ignition discharge period.

12. The internal combustion engine control device according to claim 1, wherein the combustion-state-calculation-means selection unit selects the combustion state calculation means based on a magnitude of an ignition coil voltage.

13. The internal combustion engine control device according to claim 1, wherein
the extreme value timing calculation unit
divides a period of one cycle of a time-series value of the crank rotational speed by the number of cylinders in the internal combustion engine so as to include a crank angle corresponding to a compression top dead center of each cylinder,
assigns a time-series value of the crank rotational speed in the divided period as the time-series value of the crank rotational speed in the corresponding cylinder,
converts time-series data of the time-series value of the crank rotational speed assigned to each cylinder into time-series data based on the crank angle corresponding to the compression top dead center of each cylinder, and
calculates the extreme value timing of the crank rotational speed of each cylinder from the time-series value of the crank rotational speed assigned to each cylinder after the time-series data is converted for each cylinder.

14. The internal combustion engine control device according to claim 1, wherein
the combustion state calculation means is a first correlation characteristic and a second correlation characteristic,
the first correlation characteristic in which a combustion phase representing the combustion state and an extreme value timing of the crank rotational speed have a positive correlation, and
the second correlation characteristic in which the combustion phase representing the combustion state and the extreme value timing of the crank rotational speed have a negative correlation.

15. The internal combustion engine control device according to claim 14, wherein
the combustion state calculation means is a correlation characteristic equation or a reference table based on the first correlation characteristic and the second correlation characteristic, the correlation characteristic equation or the reference table being set for each cylinder of a plurality of cylinders in the internal combustion engine, and
the combustion-state-calculation-means selection unit switches or corrects the correlation characteristic equation or the reference table in accordance with the cylinder for which the combustion state is calculated.

16. The internal combustion engine control device according to claim 1, further comprising an engine control unit that controls the internal combustion engine based on the combustion state in the combustion chamber, which is estimated by the combustion state estimation unit.

* * * * *